(12) United States Patent
Tomura et al.

(10) Patent No.: US 6,771,992 B1
(45) Date of Patent: Aug. 3, 2004

(54) PORTABLE TELEPHONE

(75) Inventors: Masashi Tomura, Kawasaki (JP); Kenji Tajima, Kawasaki (JP); Tatsuzi Shigeta, Kawasaki (JP)

(73) Assignee: Fujitsu Limited, Kawasaki (JP)

(\*) Notice: Subject to any disclaimer, the term of this patent is extended or adjusted under 35 U.S.C. 154(b) by 0 days.

(21) Appl. No.: 09/300,951

(22) Filed: Apr. 28, 1999

(30) Foreign Application Priority Data

Jul. 3, 1998 (JP) .......................................... 10-189435

(51) Int. Cl.[7] .......................... H04B 1/38; H01H 19/00; H01H 21/00; H01H 9/00; G09B 5/08

(52) U.S. Cl. .......................... 455/575.1; 200/6 A; 200/4; 345/161; 379/433.06

(58) Field of Search .......................... D13/158; 455/550, 455/556, 90, 347; 345/160, 161, 172, 189; 379/433.01, 433.06; 200/1 B, 5 A, 6 A, 6 R, 406, 18, 512–517, 17 R, 276, 276.1, 4, 1 R–1 V, 5 R; 411/508; 403/326, 290

(56) References Cited

U.S. PATENT DOCUMENTS

| | | | | |
|---|---|---|---|---|
| 4,012,155 A | * | 3/1977 | Morris | 403/290 |
| 4,408,103 A | * | 10/1983 | Smith, III | 200/6 A |
| 4,490,587 A | * | 12/1984 | Miller et al. | 200/5 A |
| 4,687,200 A | * | 8/1987 | Shirai | 200/5 A |
| 4,758,692 A | * | 7/1988 | Roeser et al. | 200/6 A |
| 4,896,003 A | * | 1/1990 | Hsieh | 200/6 A |
| 4,898,493 A | * | 2/1990 | Blankenburg | 403/326 |
| 5,227,594 A | * | 7/1993 | Russo | 200/6 A |
| 5,468,924 A | * | 11/1995 | Naitou et al. | 200/6 A |
| 5,536,911 A | * | 7/1996 | Madill | 200/6 A |
| 5,545,865 A | * | 8/1996 | Gotou | 200/341 |
| 5,555,004 A | * | 9/1996 | Ono et al. | 345/161 |
| 5,637,417 A | * | 6/1997 | Engmark et al. | 429/97 |
| 5,714,980 A | * | 2/1998 | Niino | 345/160 |
| 5,889,242 A | * | 3/1999 | Ishihara et al. | 200/6 A |
| 6,041,120 A | * | 3/2000 | Olkkola | 379/433.01 |
| 6,128,475 A | * | 10/2000 | Wicks et al. | 455/90 |
| 6,188,332 B1 | * | 2/2001 | Scarlata | 345/184 |
| 6,198,054 B1 | * | 3/2001 | Janniere | 200/5 R |
| 6,219,038 B1 | * | 4/2001 | Choa | 345/173 |
| 6,399,904 B1 | * | 6/2002 | Mimata | 200/6 A |
| 2002/0061735 A1 | * | 5/2002 | Wingett et al. | 455/90 |

FOREIGN PATENT DOCUMENTS

| | | |
|---|---|---|
| JP | 4-120132 | 10/1992 |
| JP | 5-61936 | 8/1993 |
| JP | 09200131 A | 7/1997 |
| JP | 11048576 A | 2/1999 |
| JP | 11196052 A | 7/1999 |
| JP | 11282593 A | 10/1999 |
| JP | 11353973 A | 12/1999 |

\* cited by examiner

*Primary Examiner*—Lee Nguyen
*Assistant Examiner*—Ray Persino
(74) *Attorney, Agent, or Firm*—Katten Muchin Zavis Rosenman

(57) ABSTRACT

A portable telephone includes a multi-function key-switch unit in which a key top is operated in a plurality of directions. The multi-function key-switch unit comprises a stick switch which comprises a switch body and a stick projecting from the switch body, and the approximately cylindrical key top which is attached to the stick. The key top has a stopper portion provided on the bottom surface thereof, the stopper portion coming into contact with the switch body when the key top is operated to more than a predetermined degree so as to prevent the key top from inclining more than a predetermined angle.

12 Claims, 30 Drawing Sheets

B-B-LINE CROSS SECTION

C-C-LINE CROSS SECTION

FIG. 21A
FIG. 21C
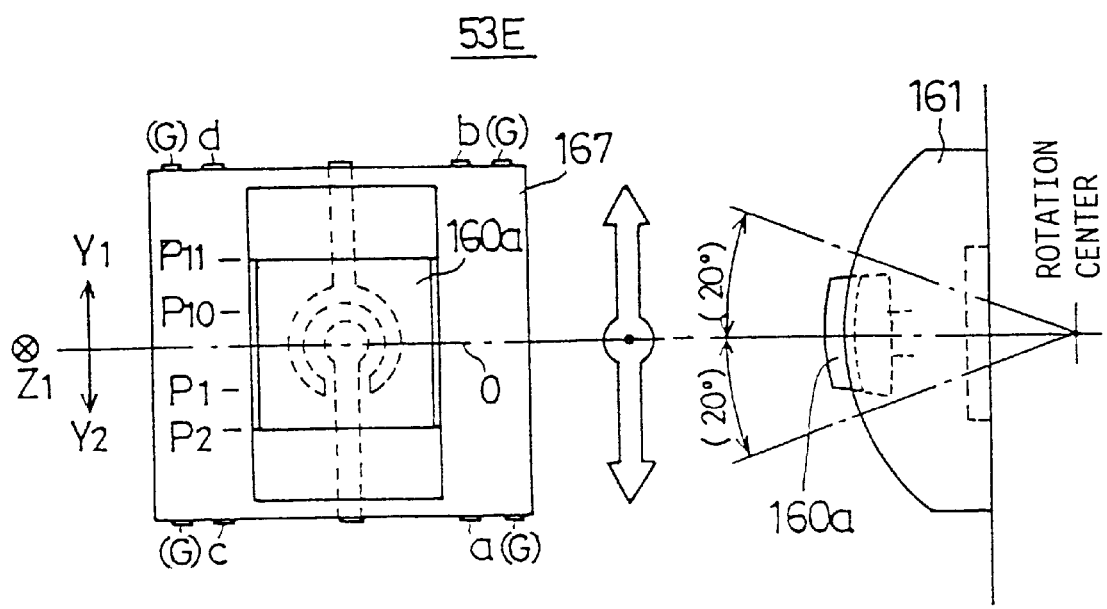
FIG. 21B
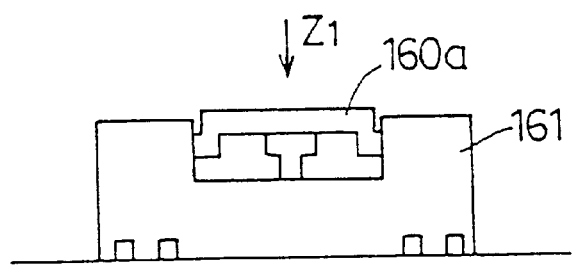

FIG. 23A
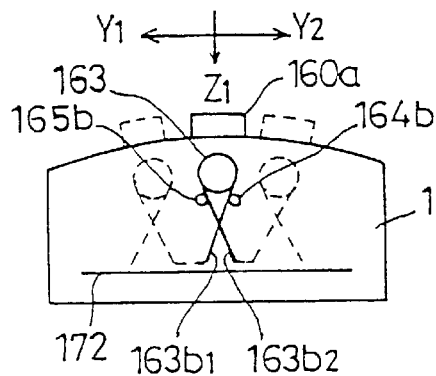
FIG. 23B
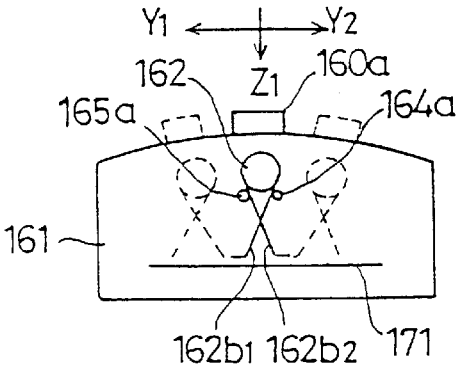
FIG. 23C
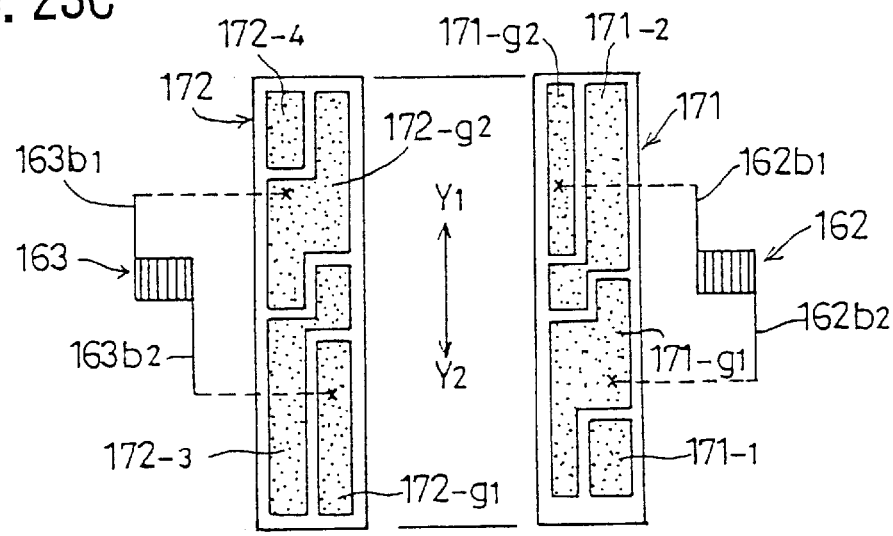
FIG. 23D

PORTABLE TELEPHONE

BACKGROUND OF THE INVENTION

1. Field of the Invention

The present invention relates to a portable telephone, and, in particular, to a portable telephone which is provided with a multi-function key-switch unit which is operated in a manner in which a key top is inclined in a plurality of directions.

In the future, a portable telephone will have a computer function by having a browser built therein, in addition to an original radio communication function. When having a computer function, a portable telephone is provided with a multi-function key-switch unit or the like which is operated as an operator operates a personal computer. Because a portable telephone is smaller than a general personal computer, it is necessary to design a special contrivance.

2. Description of the Related Art

FIG. 1A shows a multi-function key-switch unit 10 which is incorporated in a portable telephone in the related art. A key top 11 of the multi-function key-switch unit 10 in the related art is placed on a telephone-body assembly 12, and is contained in an opening 14 of a portable-telephone case 13. Pushing projections 16 are formed at four positions on the periphery on the bottom surface of the key top 11. The telephone body 12 has a printed-circuit board 17 on the top surface thereof. A plurality of dome switches 18-1 and 18-2 (actually, four dome switches) are provided on the printed-circuit board 17 at positions at which the key top 11 is placed. Each of the dome switches 18-1 and 18-2 includes a fixed contact formed on the printed-circuit board 17 and a dome-shaped movable contact member 19 which covers the fixed contact.

For example, when the key top 11 is operated in a manner in which a position 20 on the top surface 11a of the key top 11 is pushed, the key top 11 inclines as shown in FIG. 1B. As a result, the pushing projection 16 pushes the movable contact member 19 so that the dome switch 18-1 is turned on.

In the multi-function key-switch unit 10 in the related art, the plurality of dome switches 18-1 and 18-2 (actually, the four dome switches) are disposed, and the dome-shaped movable contact member 19 is provided in each dome switch, as mentioned above. Therefore, it is difficult to miniaturize the multi-function key-switch unit 10. Accordingly, the multi-function key-switch unit 10 in the related art is not suitable for being incorporated in a portable telephone which is small.

SUMMARY OF THE INVENTION

An object of the present invention is to provide a portable telephone in which the above-mentioned problem is solved.

A portable telephone according to the present invention comprises a multi-function key-switch unit in which a key top is operated in a plurality of directions. The multi-function key-switch unit comprises a stick switch which comprises a switch body and a stick projecting from the switch body, and the approximately cylindrical key top which is attached to the stick. The key top has a stopper portion provided on the bottom surface thereof, the stopper portion coming into contact with the switch body when the key top is operated to more than a predetermined degree so as to prevent the key top from inclining more than a predetermined angle.

In this arrangement, because the stopper portion is provided, when an operation is performed with a strong force, the stick switch can be protected. Further, because the stopper portion is provided on the bottom surface of the key top, it is possible to provide a mechanism, for preventing the key top from being inclined more than the predetermined angle, without increasing the size of the multi-function key-switch unit in the plan view thereof. Further, because what the stopper comes into contact with is the switch body, the multi-function key-switch unit itself can form the mechanism for preventing the key top from being inclined more than the predetermined angle. As a result, the maximum inclination angle of the key top is not affected by the variation in the accuracy with which the multi-function key-switch unit is incorporated into the portable telephone.

A portable telephone according to another aspect of the present invention comprises a multi-function key-switch unit in which a key top is operated in a plurality of directions. The multi-function key-switch unit comprises a stick switch which comprises a switch body and a stick projecting from the switch body, and the approximately cylindrical key top which is attached to the stick. The key top has a key-top body and a shaft projecting from a center of a bottom surface of the key-top body, the shaft having a nail portion which projects from an outer circumferential surface of the shaft. The stick has a pipe shape and an engagement opening in a circumference wall thereof, the nail portion engaging with the engagement opening. The stick further has a slit which extends from the engagement opening to a top end of the stick, the slit causing the pipe-shaped stick to be easily increased in a diameter thereof. The shaft of the key top is fitted into the pipe-shaped stick and the nail portion engages with the engagement opening.

In this arrangement, when a moment is developed in the key top and force of causing the shaft to slip off from the stick is developed, because the slit is provided, the pipe-shaped stick can be easily increased in the diameter thereof, and, thereby, the nail portion can easily slip out from the engagement opening. As a result, the stick switch can be protected.

A portable telephone according to another aspect of the present invention comprises a multi-function key-switch unit in which a key top is operated in a plurality of directions. The multi-function key-switch unit comprises a stick switch which comprises a switch body and a stick projecting from the switch body, and the approximately cylindrical key top which is attached to the stick. The key top has a key-top body and a shaft projecting from a center of a bottom surface of the key-top body, the shaft having a nail portion which projects from an outer circumferential surface of the shaft and a slit on a bottom-end side thereof, the slit causing the shaft to be easily reduced in a diameter thereof. The stick has a pipe shape and an engagement opening in a circumferential wall thereof, the nail portion engaging with the engagement opening. The shaft of the key top is fitted into the pipe-shaped stick and the nail portion engages with the engagement opening.

In this arrangement, because the slit is provided, the slit is narrowed and the shaft is easily reduced in the diameter thereof. As a result, the nail portion easily retreats from the engagement opening. Thereby, when the moment is developed in the key top and the force of causing the shaft to slip off from the stick is developed, the nail portion can easily slip out from the engagement opening. As a result, the stick switch can be protected.

A portable telephone according to another aspect of the present invention comprises a multi-function key-switch unit in which a key top is operated in a plurality of directions, the key top being exposed from an opening of a case of the portable telephone. The multi-function key-switch unit comprises a stick switch which comprises a switch body and a stick projecting from the switch body, and the approximately cylindrical key top which is attached to the stick. The key top has a plurality of recess portions at a periphery thereof. The case has projections on an edge of the opening. The recess portions of the key top are fitted to the projections of the case so that the key top is prevented from rotating about an axis line thereof.

A portable telephone according to another aspect of the present invention comprises a multi-function key-switch unit in which a key top is operated in a plurality of directions, the key top being exposed from an opening of a case of the portable telephone. The multi-function key-switch unit comprises a stick switch which comprises a switch body and a stick projecting from the switch body, and the approximately cylindrical key top which is attached to the stick. The key top has a plurality of projections at a periphery thereof. The case has recess portions on an edge of the opening. The projections of the key top are fitted to the recess portions of the case so that the key top is prevented from rotating about an axis line thereof.

In each of these arrangements, because the key top is prevented from rotating about the axis line thereof, when an operator operates the key top so as to rotate the key top with malicious intent, the stick switch can be prevented from being damaged.

A portable telephone according to another aspect of the present invention comprises a multi-function key-switch unit in which a key top is operated in a plurality of directions, the key top being exposed from an opening of a case of the portable telephone. The key top has a flexible ring-shaped membrane member which extends outward. The ring-shaped membrane member is in contact with an edge of the opening of the case.

In this arrangement, because the flexible ring-shaped membrane member is in contact with the edge of the opening of the case, the gap between the key top and the opening of the case is covered by this membrane member. As a result, dust can be prevented from passing through the gap and entering the portable telephone. Thus, it is possible to achieve the portable telephone in which a dust-proof function is provided.

A portable telephone according to another aspect of the present invention comprises a multi-function key-switch unit in which a key top is operated in a plurality of directions, the key top being exposed from an opening of a case of the portable telephone, the portable telephone further comprising a keypad-collection member having the property of rubber. The key top has an elastically compressible ring member attached to a circumferential surface thereof. The keypad-collection member has a ring-shaped wall at a portion thereof, the ring-shaped wall surrounding the key top. The ring member is in contact with an inner circumferential surface of the ring-shaped wall.

In this arrangement, because the ring member is in contact with the inner circumferential surface of the ring-shaped wall, the gap between the key top and the opening of the case is covered by this ring member. As a result, dust can be prevented from passing through the gap and entering the portable telephone. Because the ring member is elastically compressible, an operation of inclining the key top can be performed without difficulty.

A portable telephone according to another aspect of the present invention comprises a multi-function key-switch unit in which a key top is operated in a plurality of directions, the key top being exposed from an opening of a case of the portable telephone. A packing member is provided, the packing member having a size such that the packing member can surround the multi-function key-switch unit, the packing member being mounted on a printed-circuit board on which the multi-function key-switch unit is mounted, the packing member surrounding the multi-function key-switch unit, and the packing member being sandwiched between the printed-circuit board and a shielding member which covers the printed-circuit board. The packing member covers an opening formed between a periphery of the multi-function key-switch unit and an inner edge of an opening window which is formed in the shielding member, the opening window being larger than the multi-function key-switch unit.

In this arrangement, because the packing member covers the opening formed between the periphery of the multi-function key-switch unit and the inner edge of the opening window which is formed in the shielding member, dust can be prevented from entering a space on the printed-circuit board without attaching a special sealing member to the key top.

A portable telephone according to another aspect of the present invention comprises a multi-function key-switch unit. The multi-function key-switch unit comprises a knob which is exposed from an opening of a case of the portable telephone, the knob being movable approximately straightly in opposite directions about a central position, the knob being pushable at the central position, a spring-type contact member which is attached to the knob, the spring-type contact member moving integrally with the knob and sliding on a contact pattern, and a dome-shaped movable contact member which is deformed by the knob.

In this arrangement, because the knob is operated so as to be moved straightly, it is possible that the stroke of the knob is relatively long. As a result, an erroneous operation in which a switch which is not desired to be turned on is turned on is hardly performed.

A portable telephone according to another aspect of the present invention is provided with an infrared module into which an infrared-emitting element and an infrared-receiving element are incorporated, shielding treatment being performed on the infrared module.

In this arrangement, the portable telephone has a data communication function using infrared rays. Therefore, when mobile computing is performed, it is not necessary to use a cable for connecting the portable telephone to a portable personal computer. It is sufficient that the infrared module of the portable telephone is caused to face an infrared module of the portable personal computer. Thereby, work of connecting of a cable is not needed. As a result, it is possible to achieve the portable telephone which can be easily used. Further, because the infrared module has the shielding treatment performed thereon, an electromagnetic wave mainly emitted from the infrared-emitting element is shielded in the infrared module, and electronic parts which are located outside of the infrared module can be prevented from being affected by the electromagnetic wave. Therefore, the communication function which is the original function of the portable telephone is not adversely affected.

A portable telephone according to another aspect of the present invention is provided with an infrared module into which an infrared-emitting element and an infrared-receiving element are incorporated, the infrared module having a visible-light-emitting element which emits visible light when communication is performed using infrared rays. A window panel in front of the infrared module has an arrangement in which visible light is transmitted through the window panel at a portion at which the visible-light-emitting element emits visible light.

In this arrangement, by visually confirming that the predetermined portion of the window panel is bright, it is possible to confirm that the infrared module of the portable telephone is communicating with an infrared module of a portable personal computer using infrared rays. As a result, it is possible to confirm that the infrared module of the portable telephone is communicating with the infrared module of the portable personal computer using infrared rays while performing mobile computing. Thus, it is possible to perform mobile computing positively without anxiety.

A portable telephone according to another aspect of the present invention has a composite infrared module in which an infrared module into which an infrared-emitting element and an infrared-receiving element are incorporated and a terminal module in which one of a battery terminal and a signal terminal is incorporated in a block made of synthetic resin are integrated. The composite infrared module is positioned so that the one of the battery terminal and the signal terminal comes into contact with a terminal of a battery which is loaded in the portable telephone.

In this arrangement, the composite infrared module is mounted by effectively using a space in which a connector is provided in the related art. The connector is provided in the portable telephone in the related art, but is not provided in the portable telephone according to the present invention because the infrared module is provided so that the connector is not needed. Therefore, the composite infrared module can be incorporated into the portable telephone without specially enlarging the size thereof.

Other objects and further features of the present invention will become more apparent from the following detailed description when read in conjunction with the accompanying drawings.

BRIEF DESCRIPTION OF THE DRAWINGS

FIGS. 21A, 21B and 21C show a multi-function key-switch unit shown in FIGS. 20A and 20B;

FIGS. 23A, 23B, 23C and 23D illustrate operation of the multi-function key-switch unit shown in FIGS. 20A and 20B;

DETAILED DESCRIPTION OF THE PREFERRED EMBODIMENTS

Figure 1A:
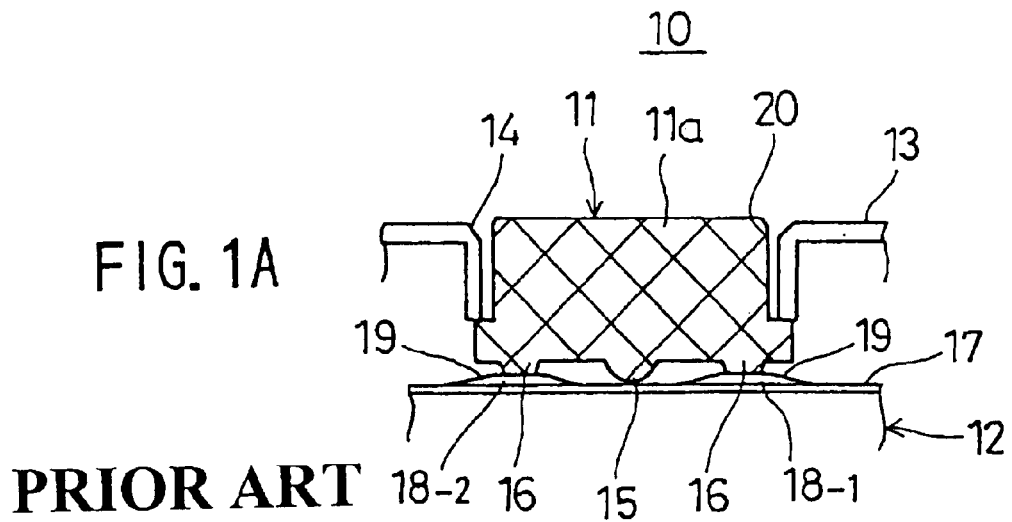
FIGS. 1A and 1B show a multi-function key-switch unit in one example of the related art.
Figure 1B:
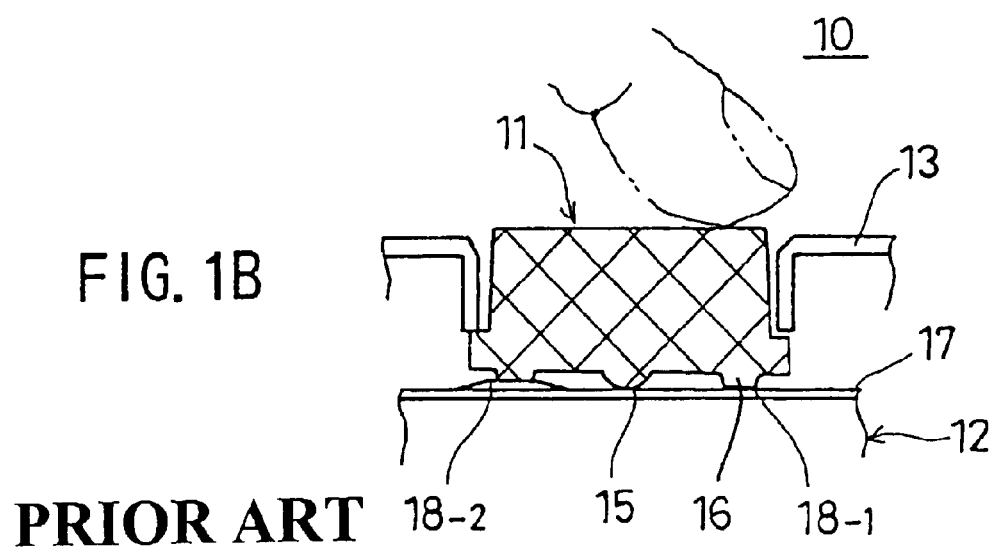

A first embodiment of the present invention will now be described.

As shown in FIGS. 2, 3A through 3D, a portable telephone 40 in the first embodiment of the present invention has an arrangement in which a telephone-body assembly 41 is incorporated into a combination of a front case 42 and a rear case 43. The directions Y1–Y2 are longitudinal directions of the portable telephone 40, the directions X1–X2 are width directions of the portable telephone 40, and the directions Z1–Z2 are depth directions of the portable telephone 40. The front case 42 has a key-pad-collection member 44 mounted inside thereof, and has a flip cover 45 on the side of the Y2-direction end of the front case 42, which flip cover 45 covers a ten key 54. The keypad-collection member 44 has the property of rubber.

Figure 4:
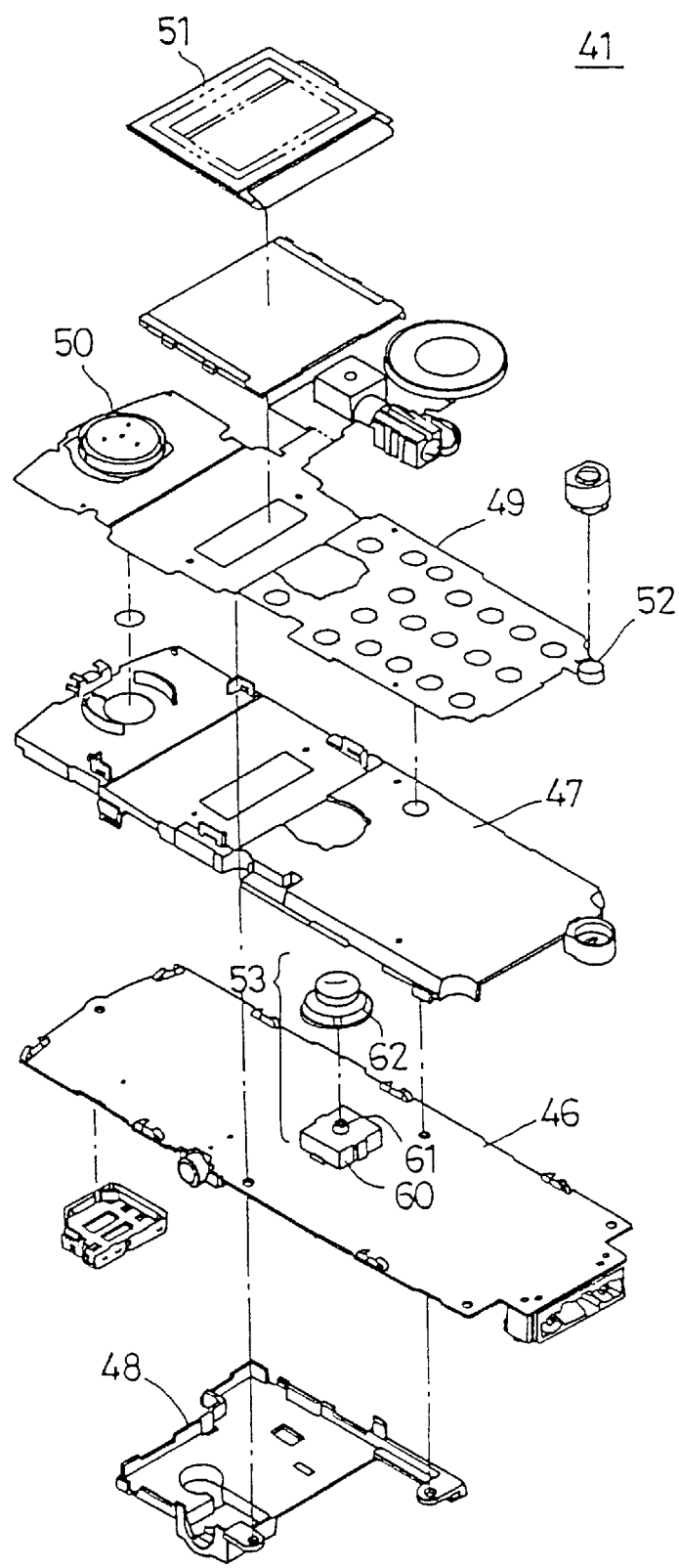
FIG. 4 shows an exploded perspective view of a telephone-body assembly of the portable telephone shown in FIG. 2.

As shown in FIG. 4, the telephone-body assembly 41 includes a printed-circuit board 46 having many electronic parts mounted on the top and bottom surfaces thereof, an upper shielding member 47 which covers the electronic parts on the top-surface side of the printed-circuit board 46, a lower shielding member 48 which covers the electronic parts on the bottom-surface side of the printed-circuit board 46, and a flexible printed-circuit board 49 provided over the upper shielding member 47. A speaker 50, a liquid crystal display unit 51 and a microphone 52 are mounted on the flexible printed-circuit board 49.

In the portable telephone 40, the speaker 50, the liquid crystal display unit 51, a multi-function key-switch unit 53, the ten key 54, and the microphone 52 are provided, in the stated sequence, from the side of the Y1-direction end to the side of the Y2-direction end of the portable telephone 40. Further, an antenna 55 is provided in the portable telephone 40, which antenna can be caused to project from the portable telephone 40.

The multi-function key-switch unit 53 will now be described.

Figure 5A:
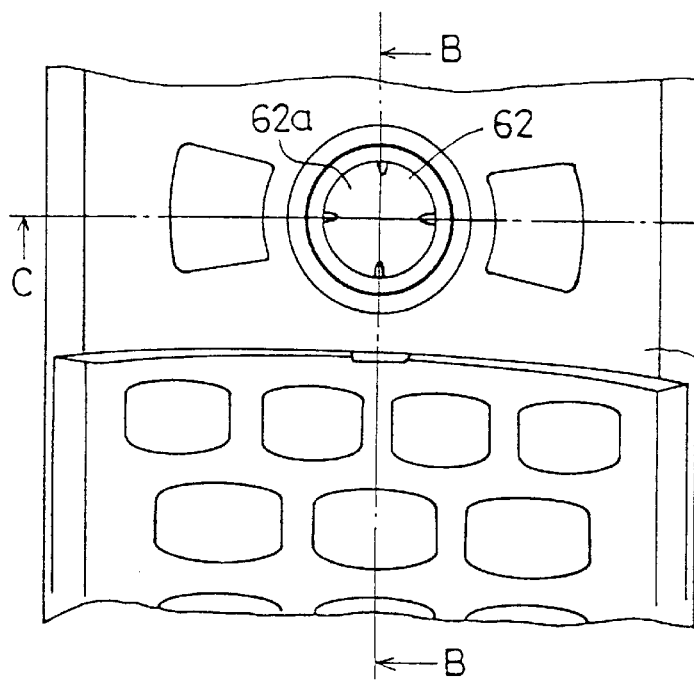
FIGS. 5A, 5B and 5C show a condition in which a multi-function key-switch unit is incorporated in the portable telephone shown in FIG. 2.
Figure 5B:
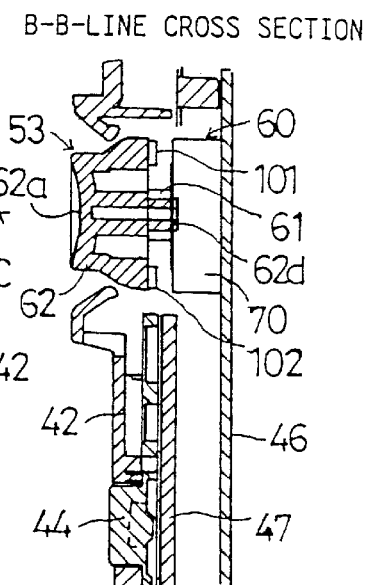
Figure 5C:
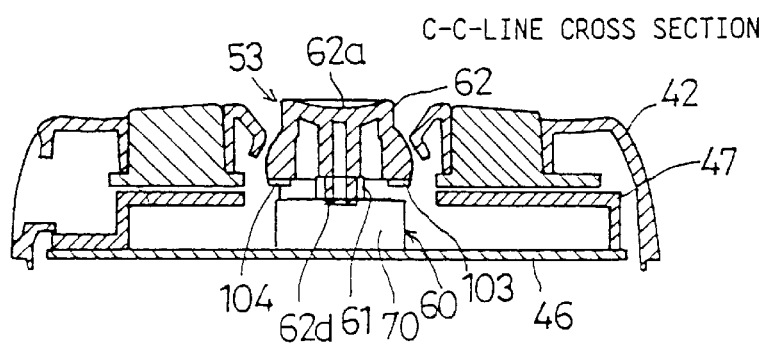

As shown in FIGS. 4, 5A through 5C and 6, an approximately cylindrical key top 62 is mounted to a stick 61 of a stick switch 60 in a manner such that a central shaft 62d of the key top 62 is fitted into the stick 61, the stick switch 60 being mounted on the top surface of the printed-circuit board 46. As shown in FIGS. 5B and 5C, the key top 62 is fitted into a circular opening 63 of the front case 42, and a circular key-top surface 62a of the key top 62 is exposed on the top surface of the front case 42. Marks 62a1 indicating operation directions are formed on the key-top surface 62a in four directions. As a result of an operator pushing the key top 62 (key-top surface 62a), the following five operations are performed on the key top 62 (key-top surface 62a): i) an operation of pushing so as to incline the key top 62 in the Y1 direction; ii) an operation of pushing so as to incline the key top 62 in the Y2 direction; iii) an operation of pushing so as to incline the key top 62 in the X1 direction; iv) an operation of pushing so as to incline the key top 62 in the X2 direction; and v) an operation of pushing the key top 62 in the Z1 direction.

When the above-mentioned operation i) is performed, a display on the liquid crystal display unit 51 scrolls in the Y1 direction. When the above-mentioned operation ii) is performed, the display on the liquid crystal display unit 51 scrolls in the Y2 direction. As a result of the operations i) and ii) being performed appropriately, a change of menus or items, a volume adjustment, a search or the like is performed.

When the above-mentioned operation iii) is performed, information set in the portable telephone such as recorded telephone numbers or the like is displayed on the liquid crystal display unit 51. When the above-mentioned operation iv) is performed, information which was used recently, such as a telephone number, for re-dialing or the like is displayed on the liquid crystal display unit 51.

When the above-mentioned operation v) is performed, a selection performed by any of the above-mentioned operations performed immediately before now is confirmed. When the operation v) is performed for a long time, an additional function such as a manner-mode function or the like is performed.

Figure 7:
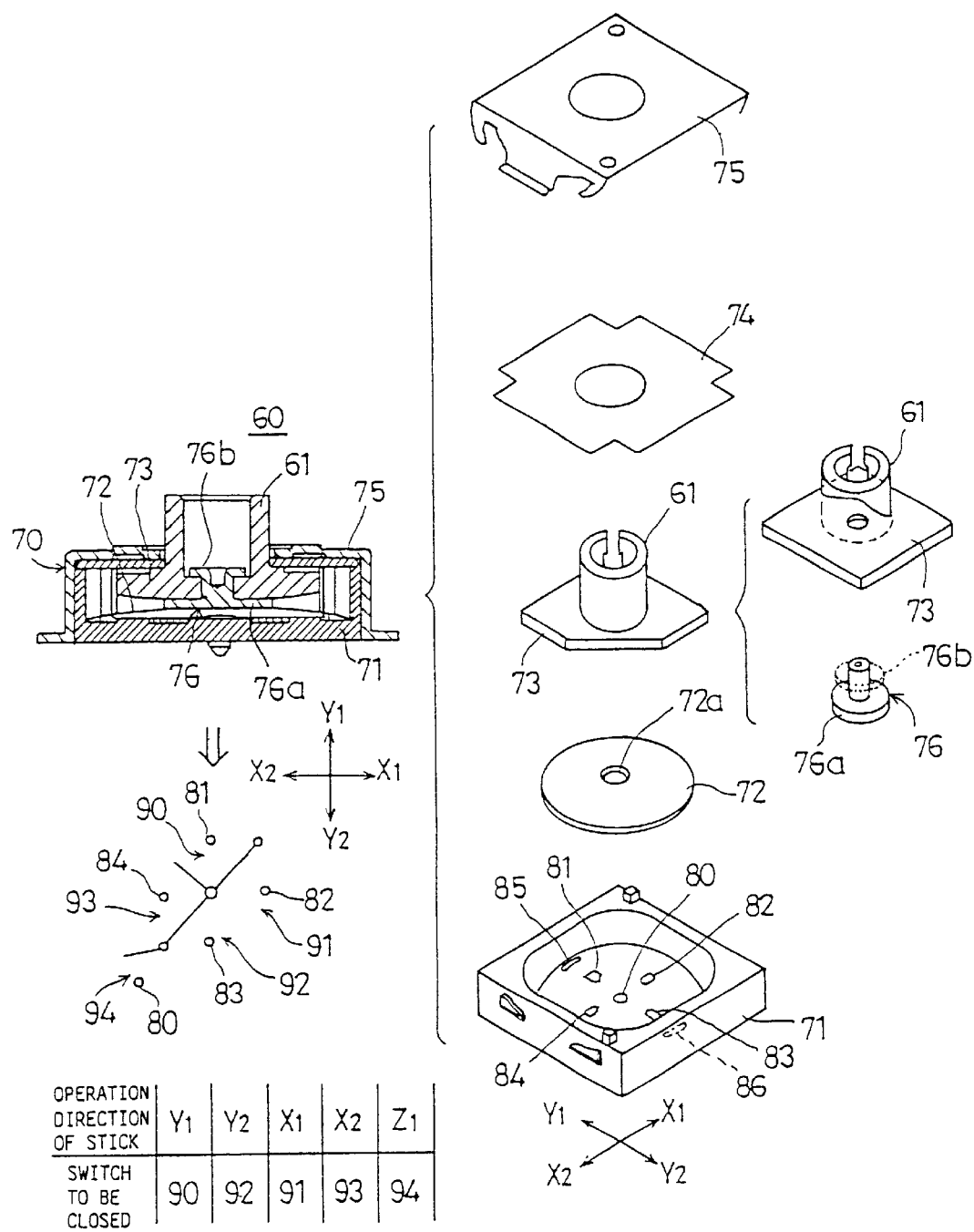
FIG. 7 shows a stick switch of the multi-function key-switch unit shown in FIGS. 5A, 5B and 5C.

The stick switch 60 will now be described. As shown in FIG. 7, the stick switch 60 has an arrangement in which the stick 61 projects upward from a stick-switch body 70. A dome-shaped movable contact member 72 and a pushing plate member 73 are incorporated into a box 71 made of synthetic resin. The pushing plate member 73 is arranged above the dome-shaped movable member 72. Further, the box 71 is covered by a covering member 75 via a flexible spacer 74. The stick 61 which is integral with the pushing plate member 73 projects upward through a hole of the covering member 75. A rivet member 76 having an outwardly extending portion 76a at the bottom thereof is inserted into a hole of the pushing plate member 73, and an upward projecting end of the rivet member 76 passing through the hole of the pushing plate member is hammered to extend outwardly to form a flange portion 76b so that the pushing plate member 73 is sandwiched by the outwardly extending portion 76a and the flange portion 76b of the rivet member 76. Thereby, the rivet member 76 is fixed to the pushing plate member 73. The dome-shaped movable contact member 72 has an opening 72a at the center thereof.

Five fixed contacts 80 through 84 and two earth contacts 85, 86 are provided on the top surface of the bottom plate of the box 71. The respective contacts are arranged so that the fixed contact 80 is located at the center, the four fixed contacts 81, 82, 83 and 84 are disposed around the fixed contact 80 in the Y1, X1, Y2 and X2 directions, respectively, at 90-degree intervals, and the earth contacts 85 and 86 are located at the Y1-direction end and the Y2-direction end, respectively. The dome-shaped movable contact member 72 is in contact with the earth contacts 85 and 86, but is apart from the five fixed contacts 80 through 84.

Five switches 90 through 94 are formed in the stick switch 60 by the dome-shaped movable contact member 72 and the five fixed contacts 80 though 84.

When an operator pushes so as to incline the stick 61 in the Y1 direction, the pushing plate member 73 pushes the dome-shaped movable contact member 72 via the outwardly extending portion 76a of the rivet member 76 so that a Y1-direction-side portion of the dome-shaped movable contact member 72 is dented. The thus-dented portion of the dome-shaped movable contact member 72 comes into contact with the fixed contact 81 so that the switch 90 is closed. When the operator releases the stick 61, the movable contact member 72 elastically restores and the stick switch 60 returns to the original condition. As a result the switch 90 is open. Similarly, when the operator pushes so as to incline the stick 61 in the Y2 direction, the pushing plate member 73 pushes the dome-shaped movable contact member 72 via the outwardly extending portion 76a of the rivet member 76 so that a Y2-direction-side portion of the dome-shaped movable contact member 72 is dented. The thus-dented portion of the dome-shaped movable contact member 72 comes into contact with the fixed contact 83 so that the switch 92 is closed. When the operator pushes so as to incline the stick 61 in the X1 direction, the pushing plate member 73 pushes the dome-shaped movable contact member 72 via the outwardly extending portion 76a of the rivet member 76 so that an X1-direction-side portion of the dome-shaped movable contact member 72 is dented. The thus-dented portion of the dome-shaped movable contact member 72 comes into contact with the fixed contact 82 so that the switch 91 is closed. When an operator pushes so as to incline the stick 61 in the X2 direction, the pushing plate member 73 pushes the dome-shaped movable contact member 72 via the outwardly extending portion 76a of the rivet member 76 so that an X2-direction-side portion of the dome-shaped movable contact member 72 is dented. The thus-dented portion of the dome-shaped movable contact member 72 comes into contact with the fixed contact 84 so that the switch 93 is closed. When the operator pushes the stick 61 in the Z1 direction, the dome-shaped movable contact member 72 is dented and the bottom of the rivet member 76 comes into contact with the fixed contact 80 so that the switch 94 is closed.

Features of the portable telephone 40 will now be described.

(1) A protection mechanism provided for a case where an operation force is too strong The protection mechanism includes the following mechanism a) and a mechanism b);

a) A mechanism for preventing the key top 62 from inclining more than a predetermined angle When any of the above-mentioned operations i), ii), iii) and iv) is performed with a force stronger than an ordinary force, that is, when the pushing operation is performed too strongly, a strong bending force is applied to the stick 61 so that the stick switch 60 is damaged. In order to prevent such a situation, a mechanism which limits the inclination angle of the key top 62 is provided. This mechanism is a main mechanism.

Figure 6:
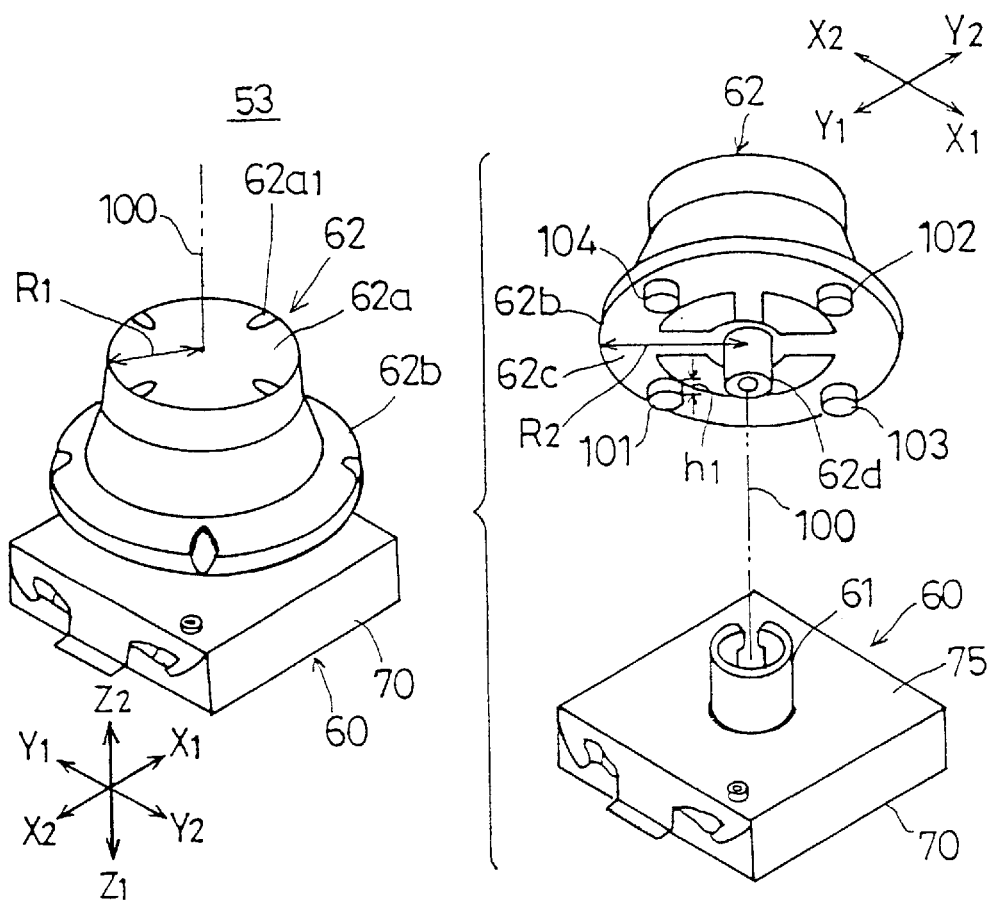
FIG. 6 shows the multi-function key-switch unit shown in FIGS. 5A, 5B and 5C.

As show in FIG. 6, the key top 62 has an approximately cylindrical shape, and has a skirt portion 62b at the bottom thereof which extends outwardly. The reference numeral 100 is given to the axis line of the key top 62. The shape of the key-top surface 62a is a circle, the radius of which is R1. The shape of the bottom surface 62c of the skirt portion 62b is a circle, the radius of which is R2. The radius R2 is larger than the radius R1. Pushing-preventing projections 101, 102, 103 and 104, each having the height h1, are formed on the bottom surface 62c of the skirt portion 62b at peripheral portions in the Y1, Y2, X1 and X2 directions at 90-degree intervals, respectively. The pushing-preventing projections 101 through 104 act as a stopper portion.

The projections 101, 102, 103 and 104 are provided for preventing the key top 62 (stick 61) from inclining more than a permissible angle α 1 (approximately 7 degrees). The positions and the height h1 of the projections 101 through 104 are determined so that, when any of the above-mentioned operations i), ii), iii) and iv) is performed with a force stronger than an ordinary force, and, thereby, the key top 62 (stick 61) inclines, the respective one of the projections 101 through 104 comes into contact with the top surface of the stick switch 60 before the inclination angle reaches the permissible angle α 1.

Figure 8A:
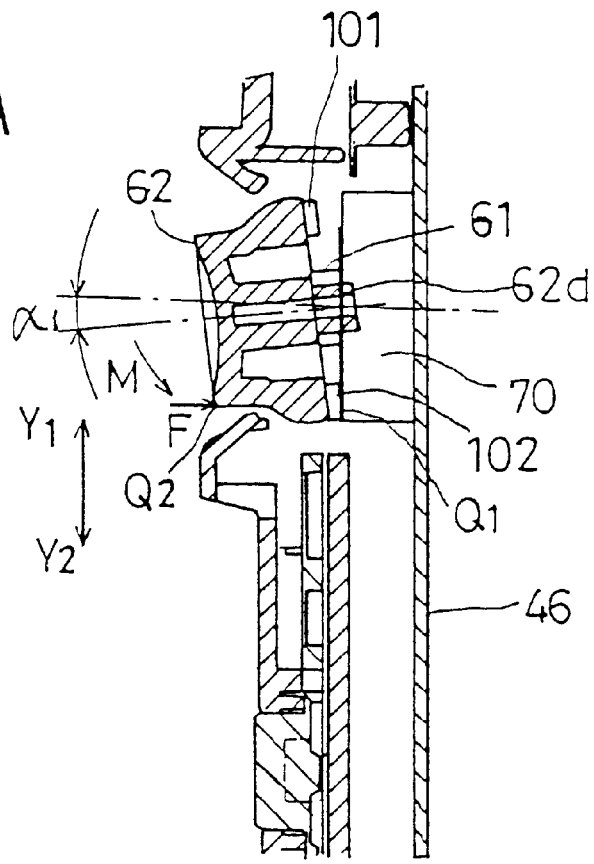
FIGS. 8A and 8B show a function of pushing-preventing projections of a key top of the multi-function key-switch unit shown in FIGS. 5A, 5B and 5C.

For example, when the above-mentioned operation ii) is performed with an operation force F stronger than an ordinary force, as shown in FIG. 8A, the key top 62 (stick 61) inclines in the Y2 direction. As a result, the projection 102 comes into contact with the top surface of the stick switch 60, and the operation force F applied to the key-top surface 62a is received by the top surface of the stick switch 60. Thereby, the key top 62 (stick 61) does not further incline in the Y2 direction, and a strong bending force is not applied to the stick 61. Therefore, the stick switch 60, mainly the switch body 70, is prevented from being damaged.

When the above-mentioned operation i) is performed with the operation force F stronger than the ordinary force, the key top 62 (stick 61) inclines in the Y1 direction reverse to the direction in the case shown in FIG. 8A. As a result, the projection 101 comes into contact with the top surface of the stick switch 60, and the operation force F applied to the key-top surface 62a is received by the top surface of the stick switch 60. Therefore, the stick switch 60 is prevented from being damaged.

Figure 8B:
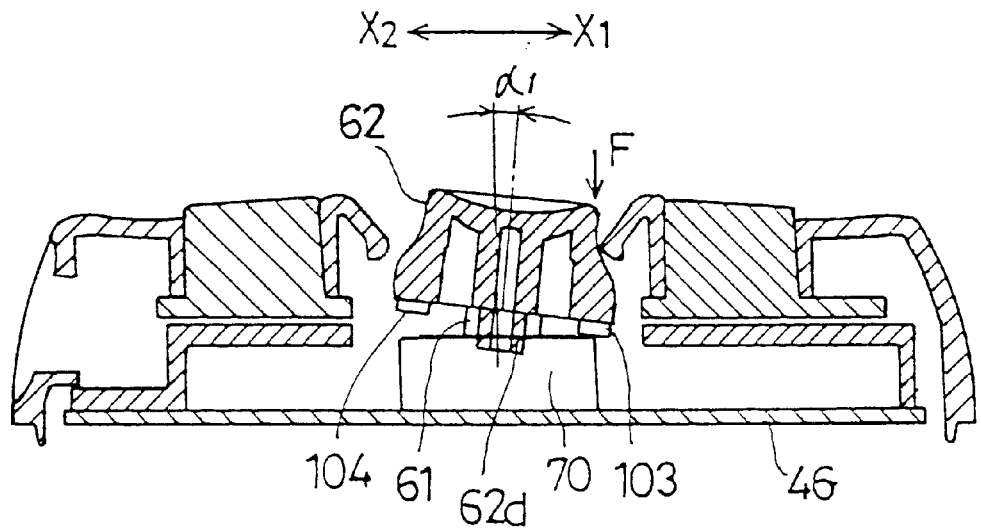

When the above-mentioned operation iii) is performed with the operation force F stronger than the ordinary force, as shown in FIG. 8B, the key top 62 (stick 61) inclines in the X1 direction. As a result, the projection 103 comes into contact with the top surface of the stick switch 60, and the operation force F applied to the key-top surface 62a is received by the top surface of the stick switch 60. Thereby, the key top 62 (stick 61) does not further incline in the X1 direction, and an strong bending force is not applied to the stick 61. Therefore, the stick switch 60, mainly the switch body 70, is prevented from being damaged.

When the above-mentioned operation iv) is performed with the operation force F stronger than the ordinary force, the key top 62 (stick 61) inclines in the X2 direction reverse to the direction in the case shown in FIG. 8B. As a result, the projection 104 comes into contact with the top surface of the stick switch 60, and the operation force F applied to the key-top surface 62a is received by the top surface of the stick switch 60. Therefore, the stick switch 60 is prevented from being damaged.

As mentioned above, the projections 101 through 104 are formed on the bottom surface 62c of the skirt portion 62b. That is, the projections 101 through 104 are formed without enlarging the size of the key top 62 in the plan view thereof. This point is advantageous for the key top 62 to be incorporated into the portable telephone 40 which is small.

Further, what any of the projections 101 through 104 comes into contact with is the top surface of the stick switch 60. Therefore, the multi-function key-switch unit 53 itself can form the mechanism which prevents the key top 62 from inclining more than the predetermined angle. As a result, the maximum inclination angle of the key top 62 is not affected by a variation in the accuracy with which the multi-function key-switch unit 53 is incorporated into the portable telephone 40. Therefore, a variation in the maximum inclination angles of the key tops 62 among the mass-produced portable telephones 40 is a minimum.

Further, because the size of the skirt portion 62b is larger than the size of the key-top surface 62a, the projections 101 through 104 are located outside of the peripheral edge of the key top surface 62a in the plan view thereof. The point Q1 at which the projection 102 comes into contact with the top surface of the stick switch 60 and the point Q2 at which the operation force F is applied to the key top 62 will now be compared, in the case where the above-mentioned operation ii) is performed as shown in FIG. 8A. When the comparison is performed in the Y1–Y2 directions in a condition in which the position of the stick 61 is considered as a reference position, the point Q1 is not located on the side of the stick 61 with respect to the point Q2, but is located on the reverse side (on the side of the Y2 direction). Therefore, the moment M, shown in FIG. 8A, is not developed by the operation force F in the condition in which the projection 102 is in contact with the top surface of the stick switch 60. (This moment M is a moment in a direction such that the moment in this direction causes the shaft 62d of the key top 62 to slip off from the stick 61.) As a result, the key top 60 is prevented from separating from the stick 61. This can be said not only in the case where the above-mentioned operation ii) is performed but also in the case where the above-mentioned operation i) is performed, in the case where the above-mentioned operation iii) is performed, and in the case where the above-mentioned operation iv) is performed.

Figure 9:
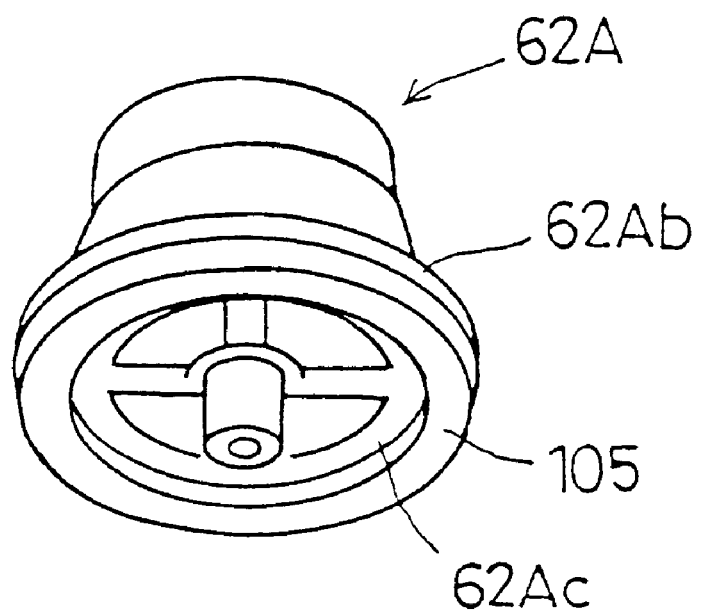
FIG. 9 shows a variant embodiment of the key top shown in FIGS. 8A and 8B, together with the stick switch to which the variant embodiment of the key top is attached.
Figure 9:
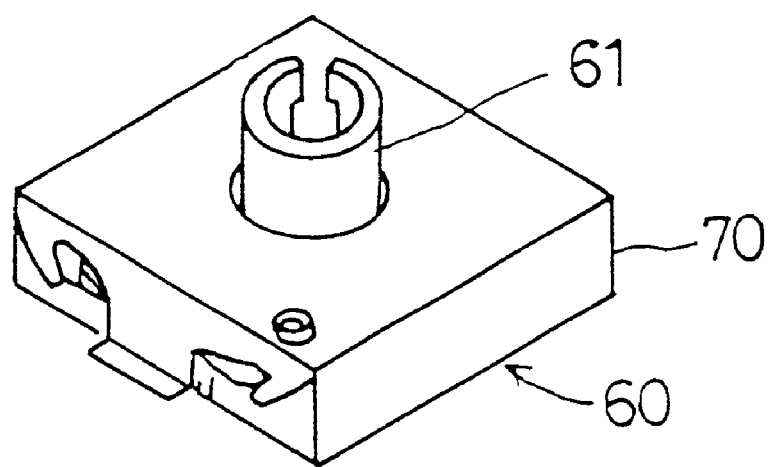

FIG. 9 shows another key top 62A. Instead of the above-projections 101 through 104, a ring-shaped pushing-preventing projection 105 is formed on the bottom surface 62Ac at a peripheral portion thereof of the skirt portion 62Ab of the key top 62A. The ring-shaped pushing-preventing projection 105 acts as a stopper portion, and functions similarly to the above-mentioned projections 101 through 104.

b) A mechanism for causing the key top 62 to separate from the stick 61 before a strong bending force is applied to the stick 61

This mechanism is a supplementary mechanism.

Figure 10:
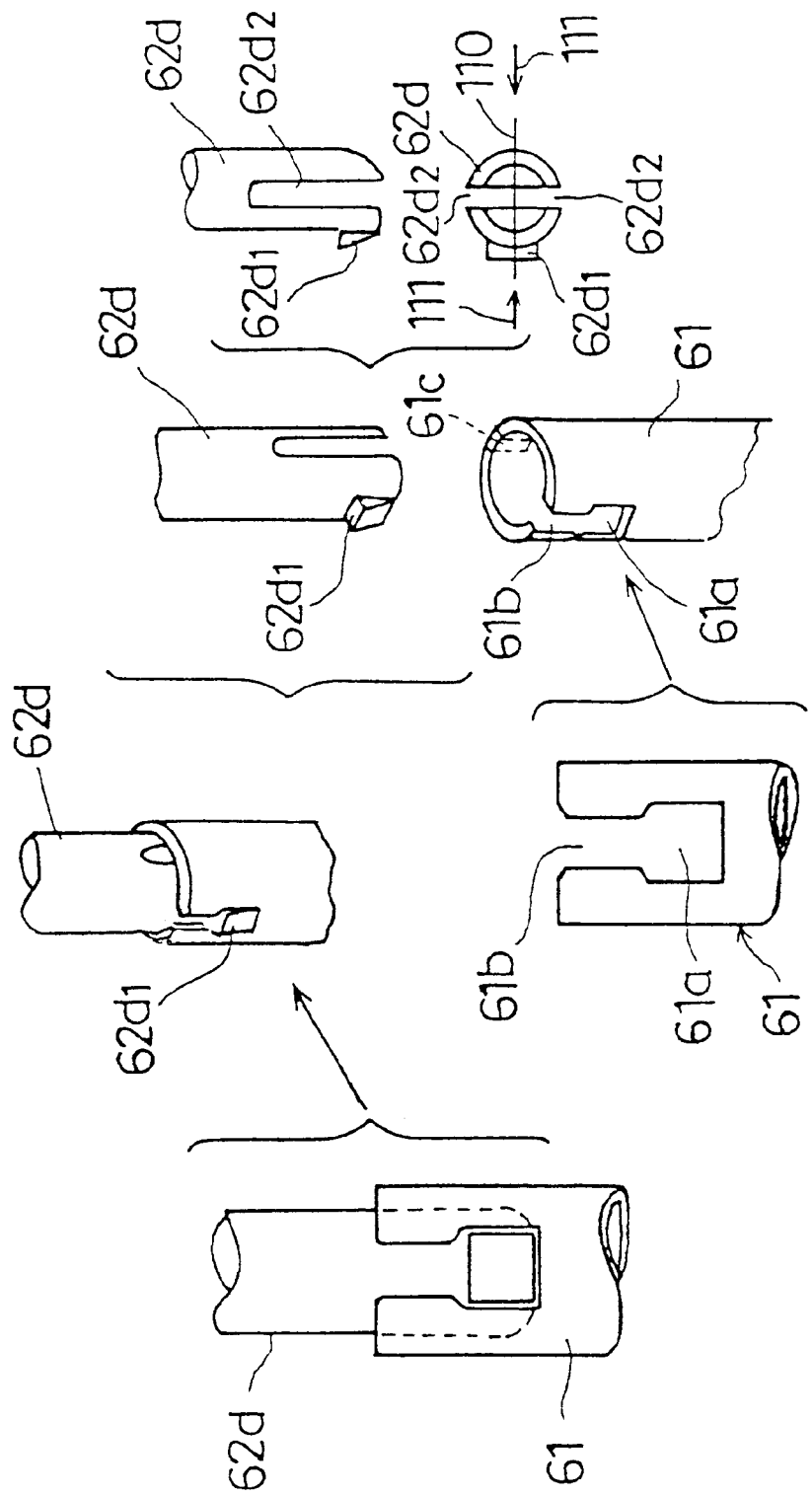
FIG. 10 shows coupling between the key top and the stick switch.

FIG. 10 shows the mechanism for causing the key top 62 to separate from the stick 61. As shown in the figure, the shaft 62d of the key top 62 has a nail portion 62d1 for engagement on the outer circumferential surface at the bottom end thereof. Further, the shaft 62d has slits 62d2 on the side of the bottom end thereof. The slits 62d2 are formed so that the diameter of the portion of the shaft 62d on the side of the bottom end can easily be reduced, that is, can easily narrow. The slits 62d2 are formed in the directions perpendicular to the diameter directions 110 which pass through the nail portion 62d1. By using the slits 62d2, the portion on the side of the bottom end of the shaft 62d can be contracted in the directions 111 (the directions 110 passing through the nail portion 62d1).

The stick 61 has the cylindrical shape, and an engagement opening 61a is formed in the circumferential wall thereof. The above-mentioned nail portion 62d1 engages with the engagement opening 61a. Further, the stick 61 has a slit 61b formed therein to extend from the engagement opening 61a to the top end of the stick 61. This slit 61b is formed so that the cylindrical stick 61 can easily deform in a manner in which the inner diameter of the stick 61 increases. When the mounted stick switch 60 is considered as a reference, the engagement opening 61a is located between the Y1 direction and the X1 direction.

The shaft 62d of the key top 62 is fitted into the cylindrical stick 61, and the nail portion 62d1 engages with the engagement opening 61a. As a result, the shaft 62d does not easily slip off from the stick 61.

When any ordinary operation is performed on the key top 62, even if this operation is performed with a strong force, the above-mentioned moment is not developed in the key top 62, and a force which causes the shaft 62d to slip off from the stick 61 is not developed. However, when an operator applies a strong force to the key top 62 in a direction near the horizontal direction so as to incline the key top 62 too much with malicious intent, the projections 101 through 104 may not function effectively. The present mechanism is provided for such a situation. When an operator operates the key top 62 with malicious intent as mentioned above, the above-mentioned moment is developed in the key top 62, and the force which causes the shaft 62d to slip off from the stick 61 is developed. When the force which causes the shaft 62d to slip off from the stick 61 reaches a predetermined force, the nail portion 62d1 forcibly widens the slit 61b, and, thereby, slips out from the engagement opening 61a. Thus, the shaft 62d of the key top 62 slips off from the stick 61, and the key top 62 separates from the stick switch 60.

Thus, the key top 62 separates from the stick switch 60 before a strong bending force is applied to the stick 61. Thereby, a problematic situation in which the stick 61 bends or breaks does not occur.

Further, as indicated by a broken line in FIG. 10, another slit 61c may be additionally provided in the stick 61 on the side reverse in the diameter directions to the side on which the slit 61b is provided. In this case, the slits are formed on both sides in the diameter directions. As a result, the shaft 62d can more smoothly slip off from the stick 61.

(2) A mechanism for preventing the key top 62 from rotating about the axis line 100

Figure 11:
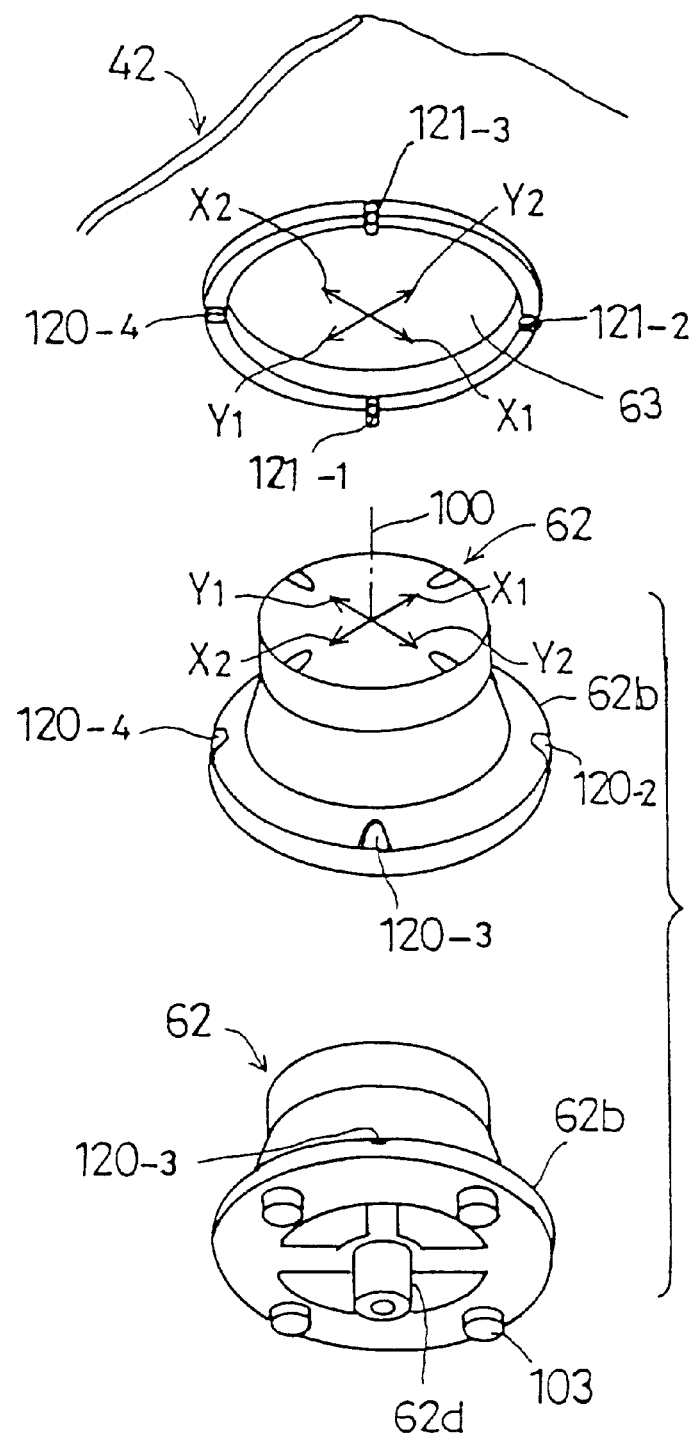
FIG. 11 shows a relationship between the key top and a front case of the portable telephone in a condition in which the key top is disassembled from the front case.
Figure 12A:
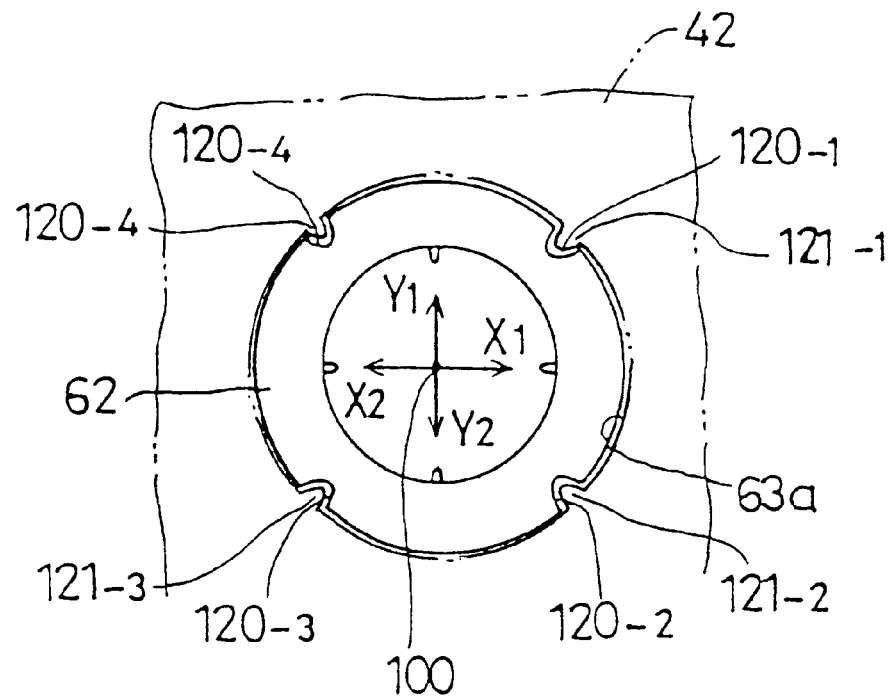
FIG. 12A shows the relationship between the key top and the front case.

As shown in FIGS. 11 and 12, the key top 62 has four recess portions 120-1 through 120-4 formed in the top surface of the skirt portion 62b at peripheral portions at 90-degree intervals in the directions at 45 degrees to the X1–X2 directions. Four projections 121-1 through 121-4 are formed, corresponding to the above-mentioned four recess portions 120-1 through 120-4, respectively, in the circular opening 63 of the front case 42. As shown in FIG. 12A, the key top 62 is fitted into the circular opening 63 in the manner in which the recess portions 120-1 through 120-4 of the key top 62 are loosely fitted to the corresponding projections 121-1 through 121-4 of the front case 42, respectively. Thereby, when an operator operates the key top 62 so as to rotate the key top 62 about the axis line 100 with malicious intent, the key top 62 does not rotate. Therefore, no twisting force is applied to the stick 61 and an accident in which the stick 61 is twisted does not occur.

Figure 12B:
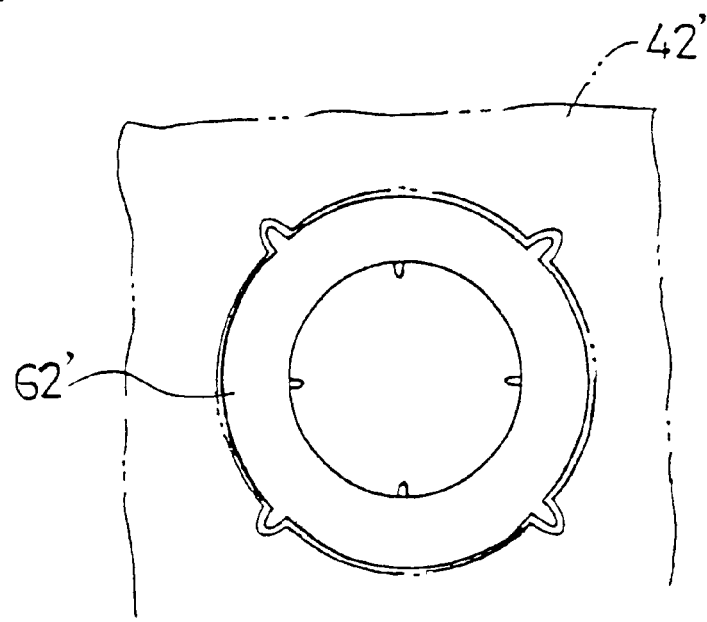
FIG. 12B shows a relationship between a key top and a front case in a portable telephone in a variant embodiment of the first embodiment.

The projection-and-recess relationship may be a relationship which is reverse to that described above. That is, it is possible that projections are formed on the key top 62 and recess portions are formed in the front case 42, as shown in FIG. 12B.

In second through eighth embodiments of the present invention, the same reference numerals are given to the same parts/portions as those of the above-described portable telephone 40 in the first embodiment, and the same reference numerals with uppercase alphabets are given to parts/portions corresponding to those of the above-described portable telephone 40 in the first embodiment, the descriptions thereof being omitted.

Each of the second, third and fourth embodiments has an arrangement for preventing dust from entering a portable telephone through the periphery of key top. The key top is operated so as to incline in our directions. Therefore, a relatively wide gap is provided between the key top and an opening of a front case, into which opening the key top is fitted, which gap is necessary for the key top to incline. Dust may enter the portable telephone through this gap. Therefore, an arrangement for preventing dust from entering the portable telephone is needed.

Figure 13A:
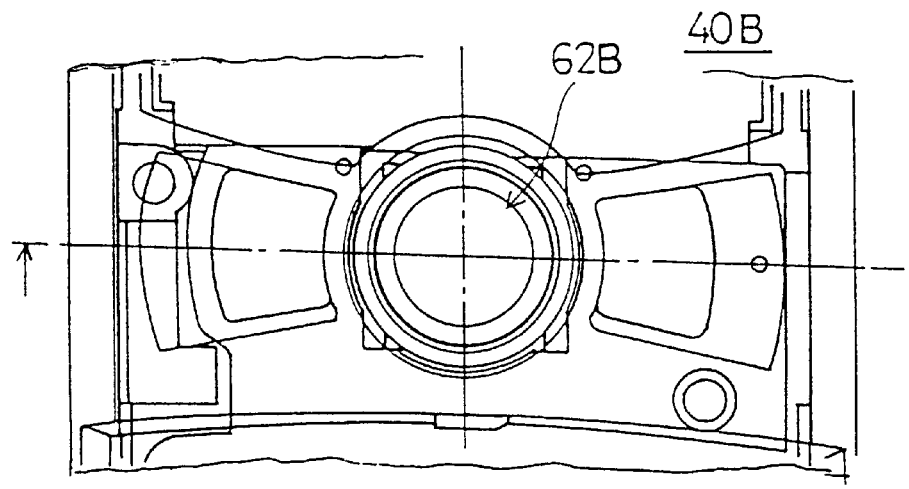
FIGS. 13A, 13B and 13C show part of a portable telephone in a second embodiment of the present invention.
Figure 13B:
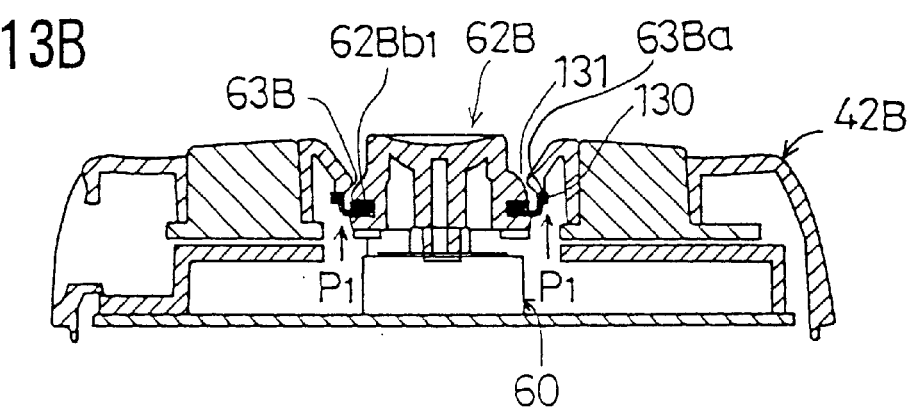
Figure 13C:
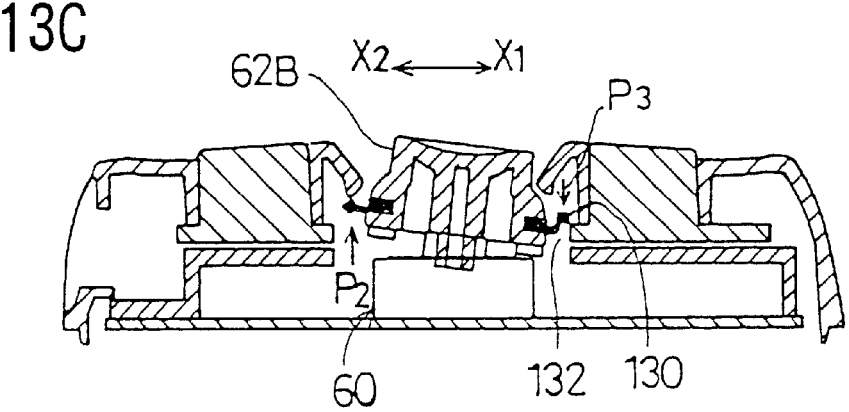

FIGS. 13A, 13B and 13C show part of a portable telephone 40B in the second embodiment of the present invention.

Figure 14:
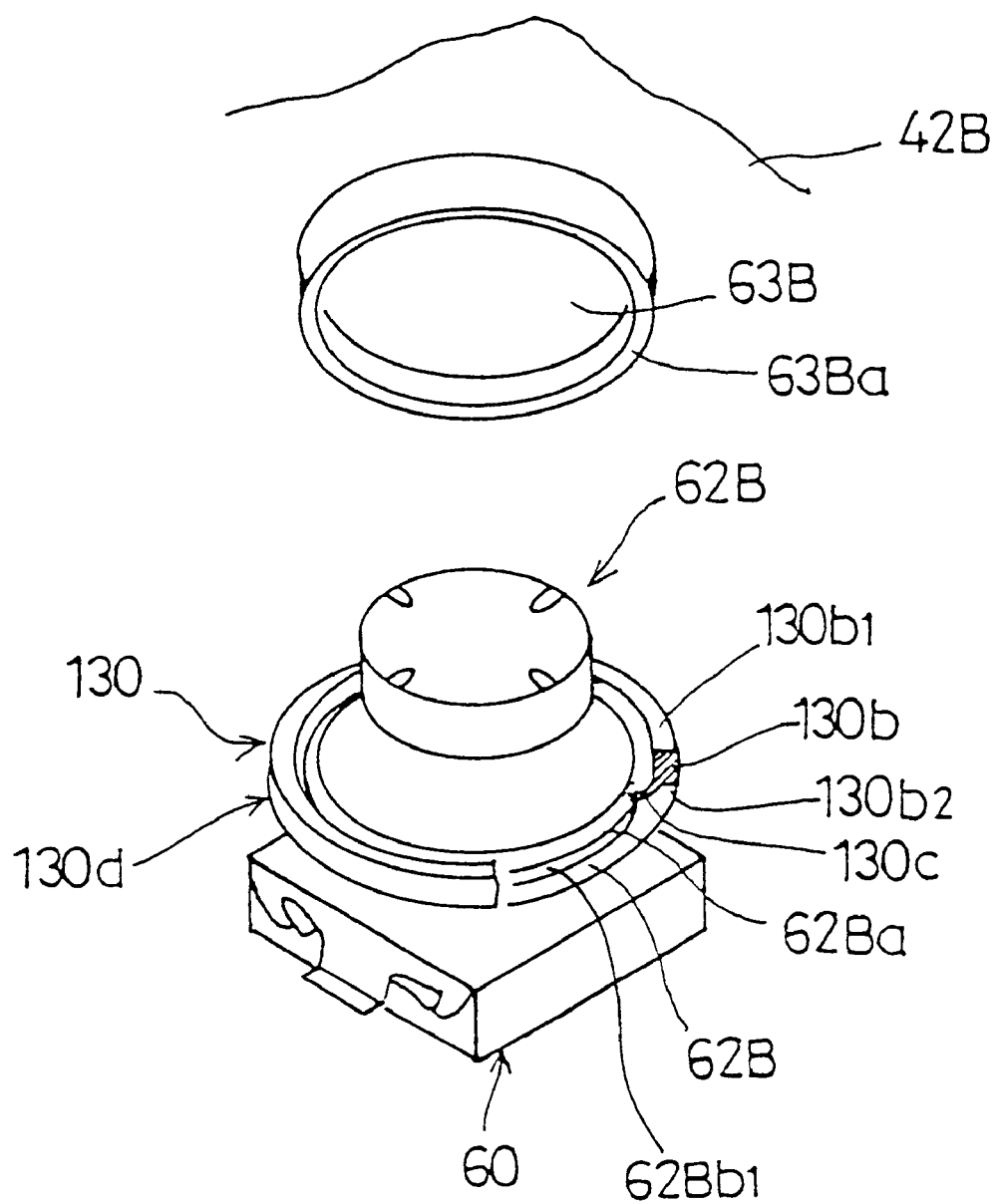
FIG. 14 shows an arrangement of the periphery of a key top shown in FIGS. 13A, 13B and 13C.
Figure 15A:
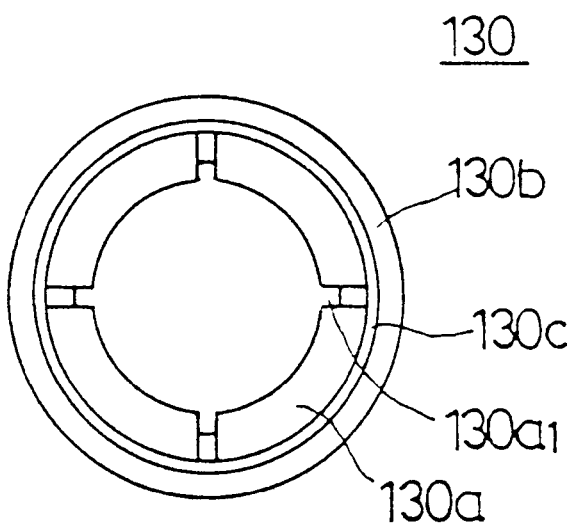
FIGS. 15A, 15B, 15C and 15D show a ring-shaped membrane member shown in FIG. 14.
Figure 15B:
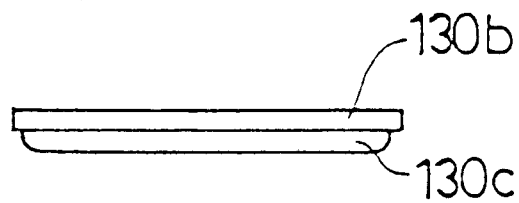
Figure 15C:
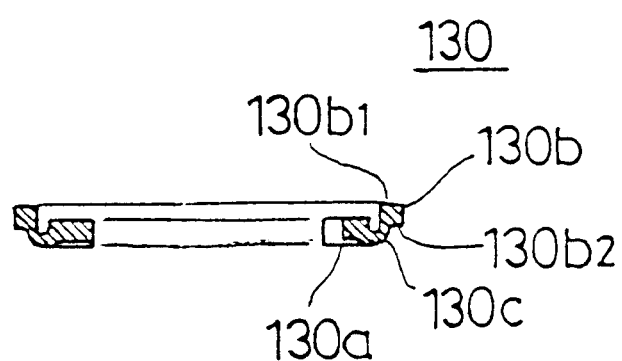
Figure 15D:
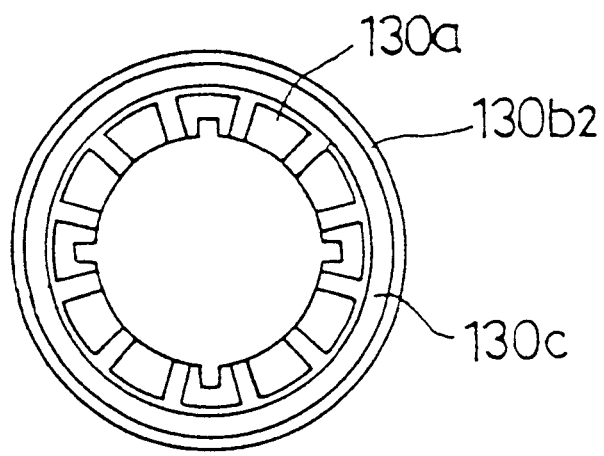

With reference also to FIG. 14, a ring-shaped membrane member 130 made of rubber and having flexibility is attached to a key top 62B in a manner in which the ring-shaped membrane member 130 is fitted into a ring-shaped groove 62Bb1 formed in a skirt portion 62Bb of the key top 62B.

As shown in FIGS. 15A through 15D, the ring-shaped membrane member 130 includes an inner ring-shaped portion 130a, an outer ring-shaped portion 130b, and a ring-shaped membrane portion 130c between the inner and outer ring-shaped portions 130a and 130b. The outer ring-shaped portion 130b has a ring-shaped top surface 130b1 and a ring-shaped bottom surface 130b2. The ring-shaped membrane member 130 is attached to the skirt portion 62Bb of the key top 62B in a manner in which the inner ring-shape portion 130a is fitted into the ring-shaped groove 62Bb1 of the skirt portion 62Bb and, by using cut-outs 130a1 formed in the inner ring-shaped portion 130a, the ring-shaped membrane member 130 is prevented from rotating. For this purpose, projections (not show in the figures) are provided in the ring-shaped groove 62Bb1 of the skirt portion 62Bb and are fitted into the cut-outs 130a1, respectively. The ring-shaped membrane portion 130c and the outer ring-shaped portion 130b extend outwardly from the skirt portion 62Bb of the key top 62B so as to have a ring shape. The reference numeral 130d is given to the outwardly extending portion which extends outwardly so as to have the ring shape and includes the outer ring-shaped portion 130b and the ring-shaped membrane portion 130c. This outwardly extending portion 130d elastically bends freely.

FIGS. 13A and 13B show a condition in which the key top 62B is not being operated. The ring-shaped top surface 130b1 of the outer ring-shaped portion 130b is in contact with a circular edge 63Ba of the circular opening 63B of the front case 42B over the entire circumference thereof. Thereby, a ring-shaped gap 131 between the key top 62B and the circular opening 63B is covered by the outwardly extending portion 130d. As a result, no dust enters the portable telephone 40B.

When the outwardly extending portion 130d is considered, the outer ring-shaped portion 130b is slightly lowered in the condition shown in FIG. 13B in comparison to a condition in which no external force is applied to the outer ring-shaped portion 130b. Thus, the ring-shaped membrane portion 130c is elastically bent in the condition shown in FIG. 13B. Due to the elastic force P1 of the ring-shaped membrane portion 130c, the ring-shaped top surface 130b1 of the outer ring-shaped portion 130b is pressed against the circular edge 63Ba of the circular opening 63B of the front case 42B. Thereby, the above-mentioned gap is tightly covered by the outwardly extending portion 130d.

FIG. 13C shows a condition in which an operator operates so as to incline the key top 62B in the X1 direction. Also in this condition, the outwardly extending portion 130d covers the above-mentioned gap 131 and a gap 132 between the key top 62B and the keypad-collection member 44. Therefore, also when the key top 62B is operated, no dust enters the portable telephone 40B.

In this condition, for the portion of the outwardly extending portion 130d on the X2-direction side, the outer ring-shaped portion 130b is pushed downward and the ring-shaped membrane portion 130c is further elastically bent. The elastic force P2 of the ring-shaped membrane portion 130c causes the portion of the top surface 130b1 of the outer ring-shaped portion 130b to be pressed against the circular edge 63Ba of the circular opening 63B of the front case 42B. For the portion of the outwardly extending portion 130d on the X1-direction side, the bottom surface 130b2 of the outer ring-shaped portion 130b is pressed against an edge 44b of a U-shaped cut-out 44a of the keypad-collection member 44 (see FIG. 2). As a result, the ring-shaped membrane portion 130c is elastically bent. The elastic force P3 of the ring-shaped membrane portion 130c causes the portion of the bottom surface 130b2 of the outer ring-shaped portion 130b to be pressed against the edge 44b of the U-shaped cut-out 44a of the keypad-collection member 44. Originally, the U-shaped cut-out 44a is formed for providing a space in which the key top 62B which is operated moves. The above-mentioned gap 132 is covered by the outwardly extending portion 130d on a side in a direction in which the key top 62B is inclined, as mentioned above.

Also in a case where the key top 62B is operated so as to be inclined in any direction other than the X1 direction, similarly to the above-described operation, the outwardly extending portion 130d covers the above-mentioned gap 131 and gap 132.

The third embodiment of the present invention will now be described.

Figure 16A:
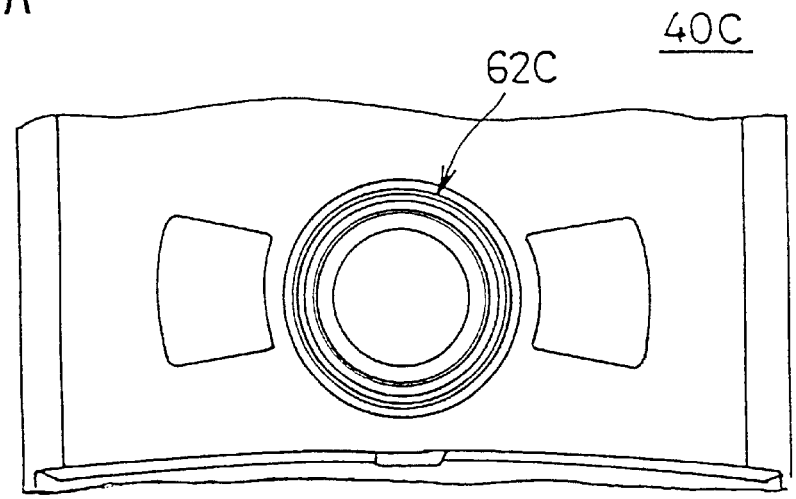
FIGS. 16A, 16B and 16C show part of a portable telephone in a third embodiment of the present invention.
Figure 16B:
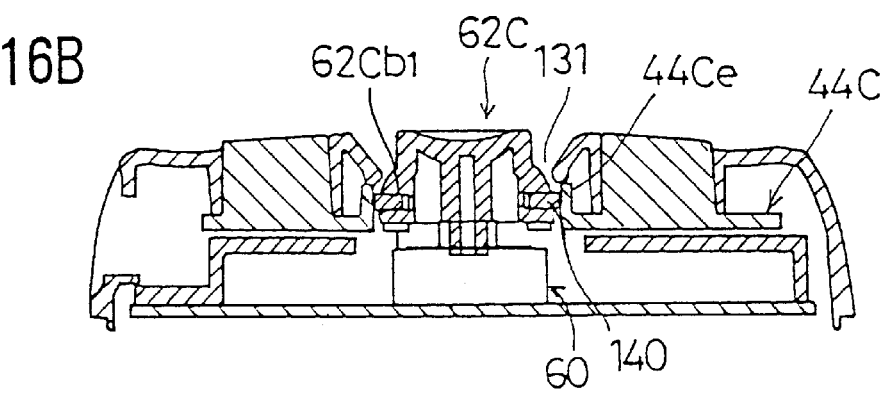
Figure 16C:
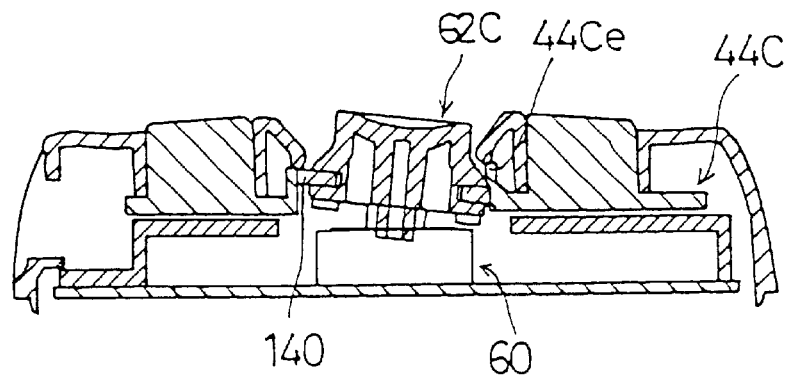

FIGS. 16A, 16B and 16C show part of a portable telephone 40C in the third embodiment of the present invention.

Figure 17:
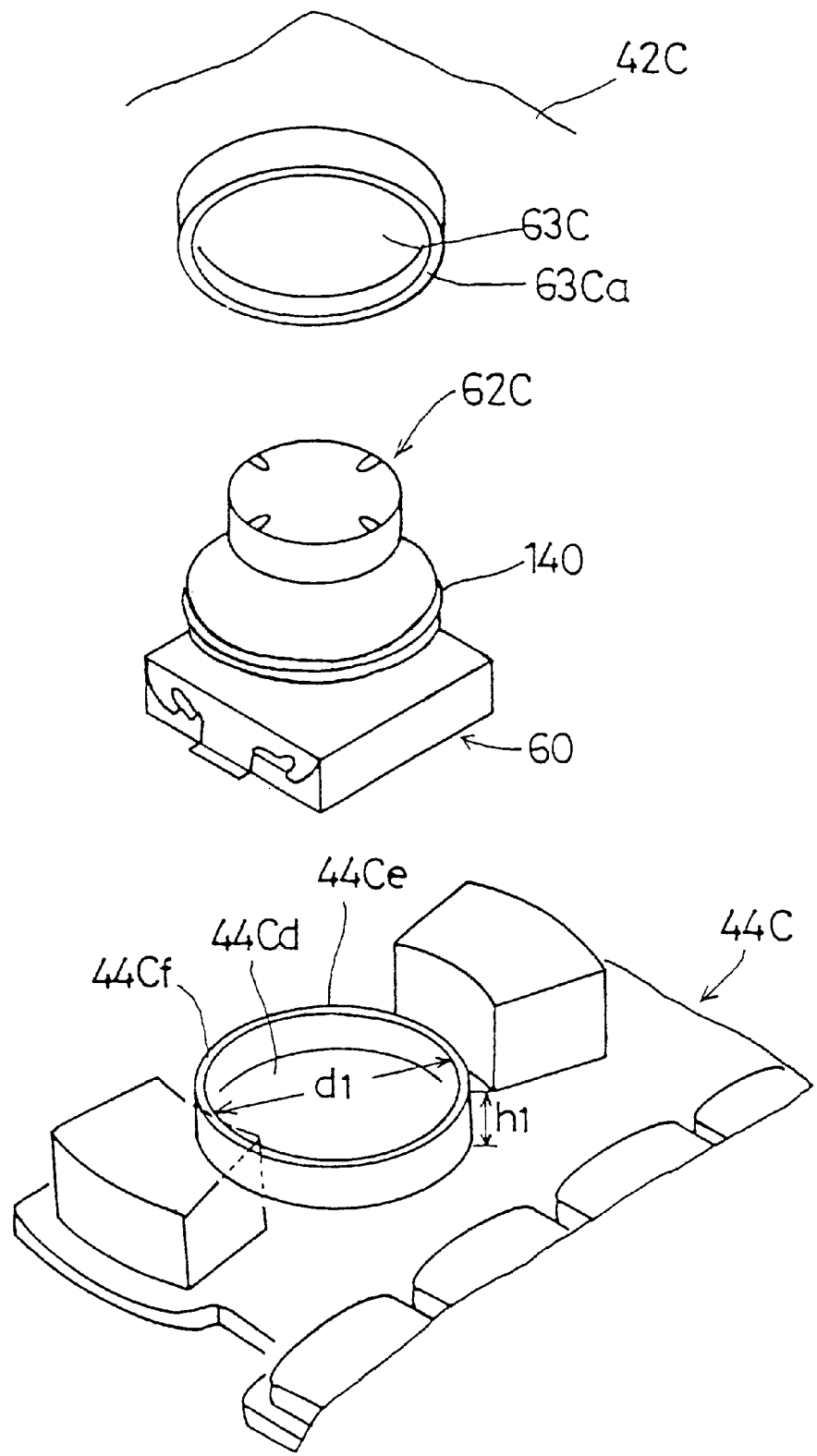
FIG. 17 shows an arrangement of the periphery of a key top shown in FIGS. 16A, 16B and 16C.

With also reference to FIG. 17, a key top 62C has a ring member 140 attached thereto in a manner in which the ring member 140 is fitted into a ring-shaped groove 62Cb1 formed in a skirt portion 62Cb of the key top 62C. The ring member 140 is made of sponge and can be elastically compressed. The ring member 140 slightly projects from the skirt member 62Cb outwardly.

Figure 2:
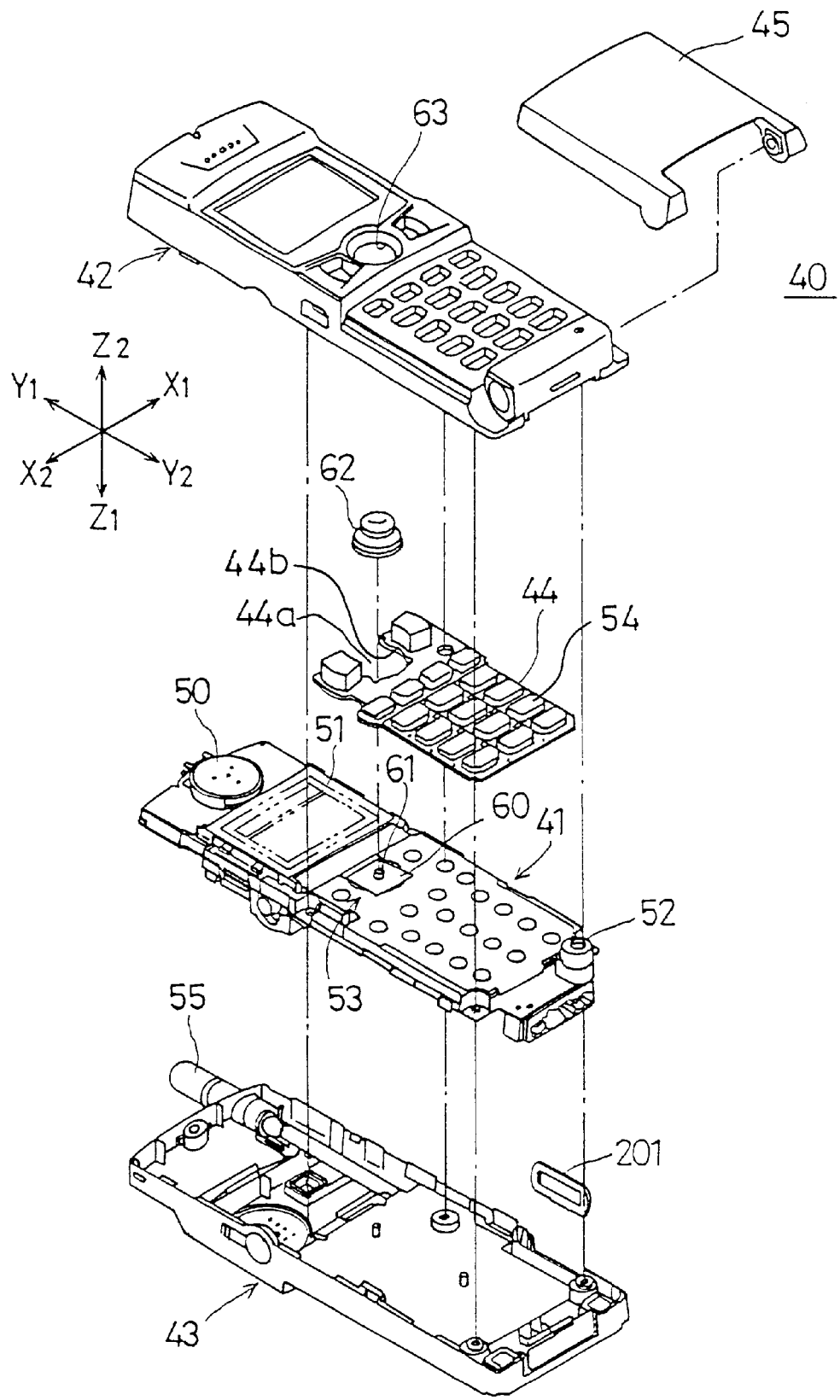
FIG. 2 shows an exploded perspective view of a portable telephone in a first embodiment of the present invention.
Figure 3A:
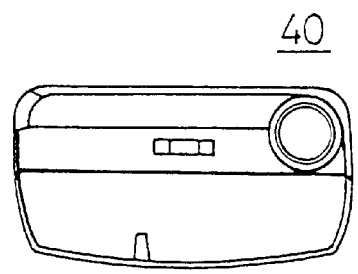
FIGS. 3A, 3B, 3C and 3D show the portable telephone in the first embodiment of the present invention.
Figure 3B:
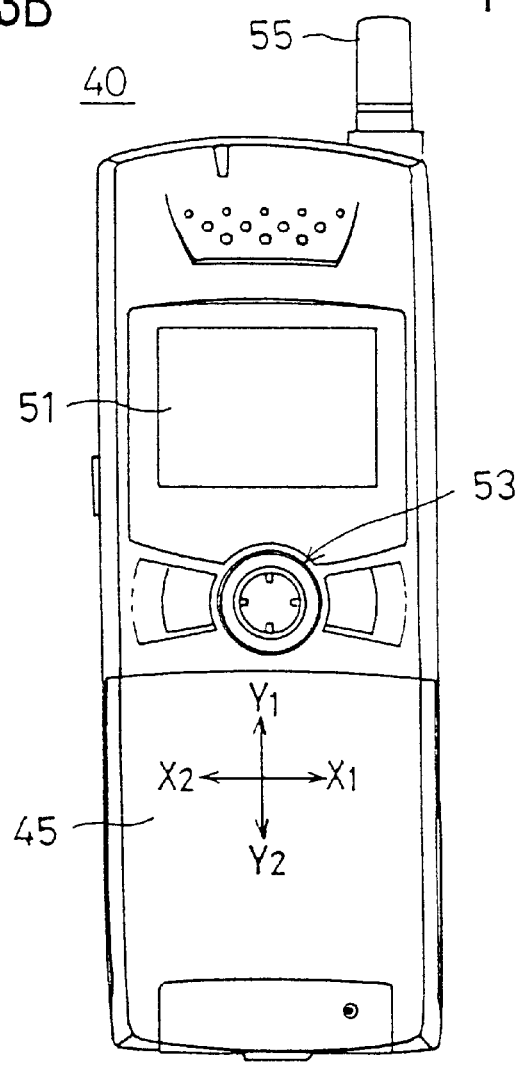
Figure 3D:
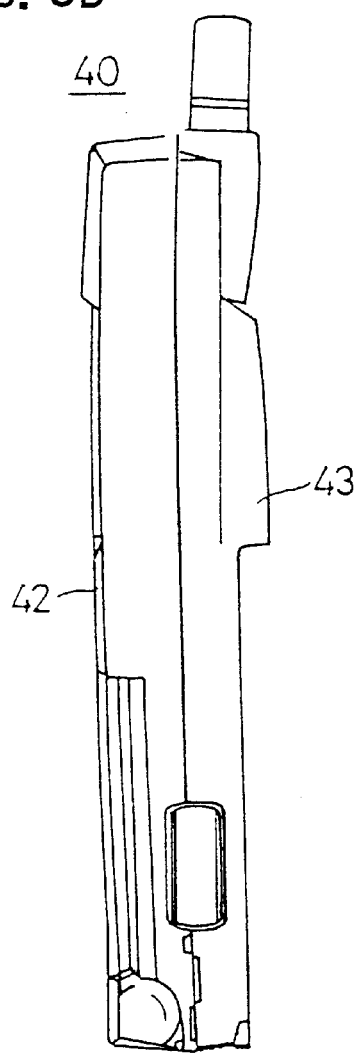
Figure 3C:
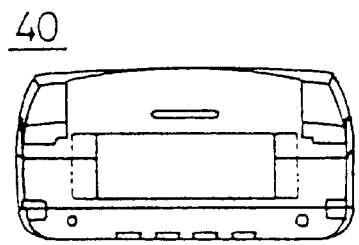

A keypad-collection member 44C has, instead of the U-shaped cut-out 44a of the keypad-collection member 44 shown in FIG. 2, a circular opening 44Cd and a ring-shaped wall 44Ce which stands along the edge of the opening 44Cd. The ring-shaped wall 44Ce has the predetermined diameter of d1 and the height of h1.

As shown in FIG. 16B, in a condition in which the portable telephone 40C has been assembled, the top-end surface 44Cf of the ring-shaped wall 44Ce is in contact with a circular edge 63Ca of a circular opening 63C of a front case 42C over the entire circumference of the circular edge 63Ca. Further, the ring-shaped wall 44Ce surrounds the skirt portion 62Cb of the key top 62C, and the elastically compressed ring member 140 is in contact with the inner-circumferential wall surface of the ring-shaped wall 44Ce over the entire circumference thereof. Thereby, the ring-shaped gap 131 between the key top 62C and the circular opening 63C is covered. As a result, dust is prevented from entering the portable telephone 40C.

As shown in FIG. 16C, mainly the ring member 140 is elastically compressed while the key top 62C is operated. Also in the condition in which the key top 62C is operated, the elastically compressed ring member 140 is in contact with the inner-circumferential wall surface of the ring-shaped wall 44Ce over the entire circumference thereof. Thereby, the above-mentioned gap 131 is covered, and, as a result, dust is prevented from entering the portable telephone 40C.

Because the ring member 140 can be elastically compressed, an operation of inclining the key top 62C is performed without difficulty.

The fourth embodiment of the present invention will now be described.

Figure 18A:
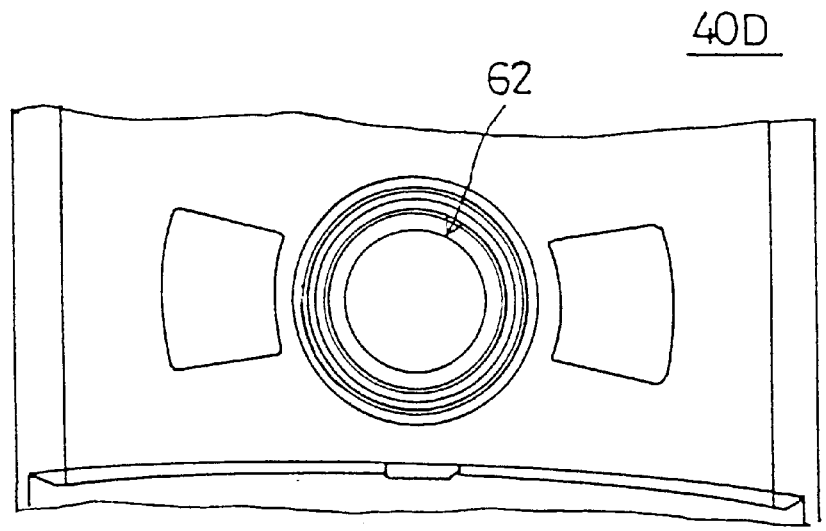
FIGS. 18A, 18B and 18C show part of a portable telephone in a fourth embodiment of the present invention.
Figure 18B:
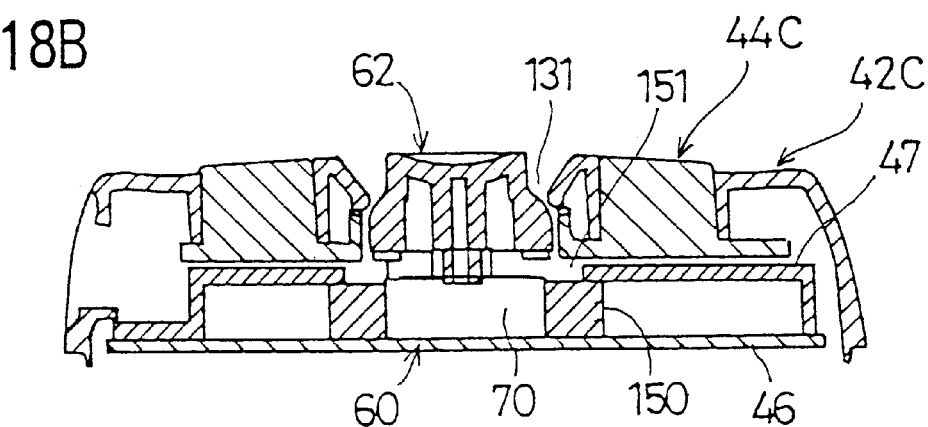
Figure 18C:
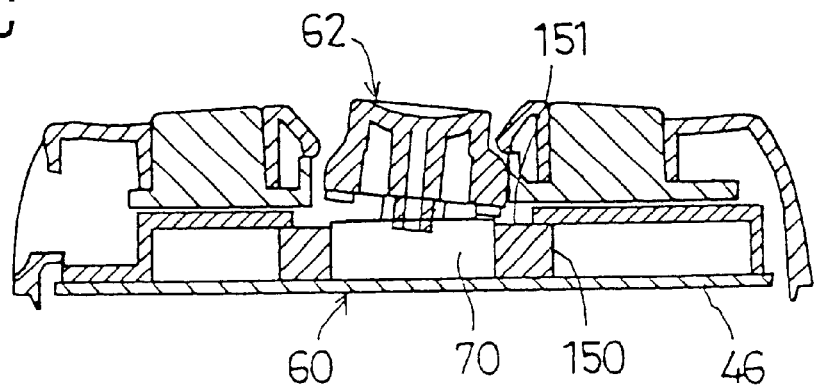

FIGS. 18A, 18B and 18C show part of a portable telephone 40D in the fourth embodiment of the present invention.

Figure 19:
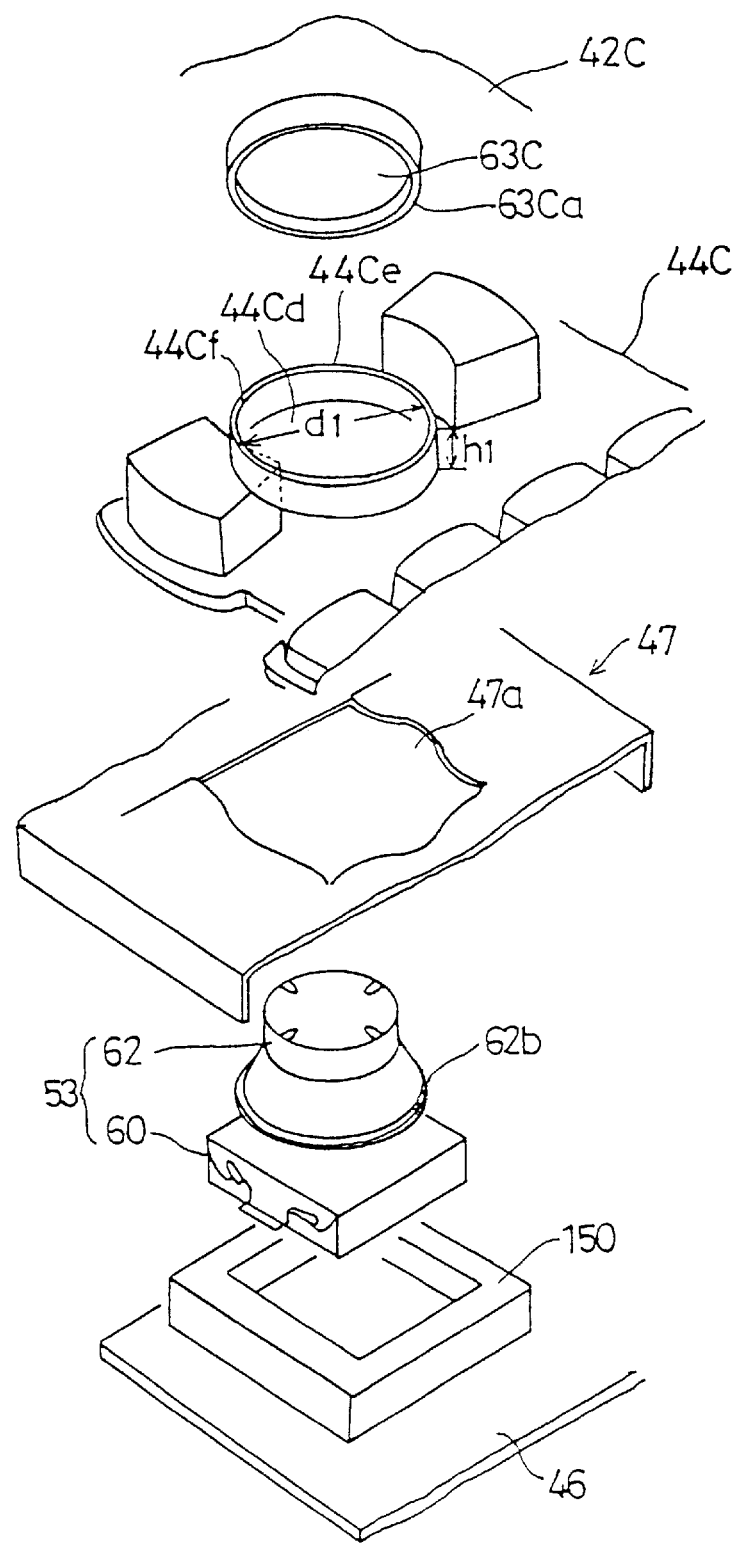
FIG. 19 shows an exploded view of the periphery of a multi-function key-switch unit shown in FIGS. 18A, 18B and 18C.

With reference also to FIG. 19, the keypad-collection member 44C, a packing member 150, the upper shielding member and so forth are provided around the multi-function key-switch unit 53. The packing member 150 is made of sponge and has a rectangular-frame shape having the size corresponding to the stick switch 60. An opening window 47a, which is larger than the stick switch body 70, for allowing the stick switch body 70 to be located inside thereof, is formed in the upper shielding member 47.

The multi-function key-switch unit 53 has an arrangement in which the stick switch 60 is mounted on the printed-circuit board 46. The top-end surface 44Cf of the ring-shaped wall 44Ce of the key-pad-collection member 44C is in contact with the circular edge 63Ca of the circular opening 63C of the front case 42C over the entire circumference thereof. The skirt portion 62b of the key top 62 is located inside of the ring-shaped wall 44Ce. The packing member 150 is fitted around the stick switch body 70, and is sandwiched between the printed-circuit board 46 and the upper shielding member 47 so that the packing member 150 is compressed a little. Thus, the packing member 150 covers a rectangular-frame-shaped opening 151 existing between the periphery of the stick switch body 70 and the edge of the opening window 47a. The key top 62 is provided with no special sealing member.

FIG. 18C shows a condition in which the key top 62 is operated so as to be inclined in the X1 direction.

Thus, when dust enters the ring-shaped gap 131 between the key top 62 and the circular opening 63C, because the opening 151 is covered by the packing member 150, the dust is prevented from entering a space on the printed-circuit board 46. Further, because the ring-shaped wall 44Ca is provided, dust is prevented from entering the rear side of the front case 42C.

The packing member 150 which covers the opening 151 absorbs water drops which enter the gap 131, and, thus, has a drip-proof function for preventing water drops from entering the space on the printed-circuit board 46.

The fifth embodiment of the present invention will now be described.

Figure 20A:
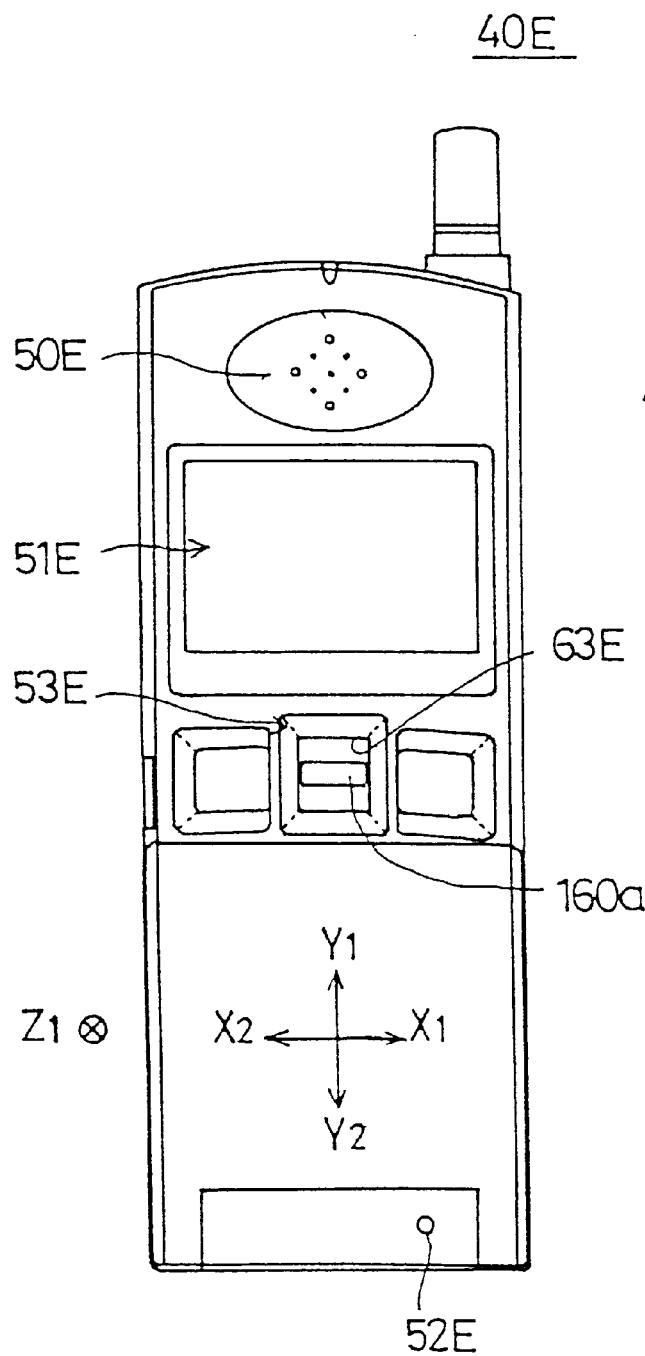
FIGS. 20A and 20B show a portable telephone in a fifth embodiment of the present invention.
Figure 20B:
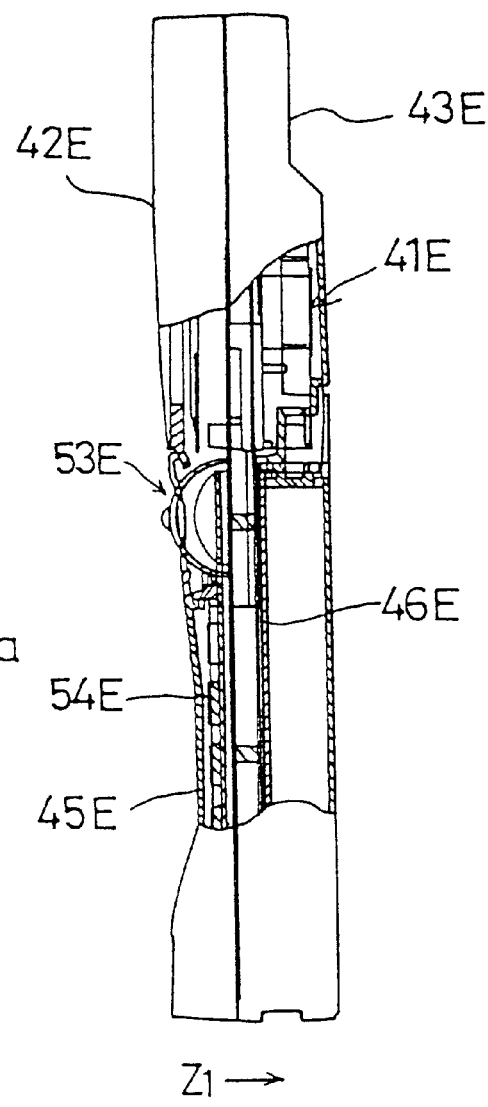

FIGS. 20A and 20B show a portable telephone 40E in the fifth embodiment of the present invention. The portable telephone 40E has an arrangement in which the telephone-body assembly 41 is incorporated into a combination of a front case 42E and a rear case 43E. In the portable telephone 40E, a speaker 50E, a liquid crystal display unit 51E, a multi-function key-switch unit 53E, a ten key 54E (covered by a flip cover 45E), and a microphone 52E are provided, in the stated sequence, from the side of the Y1-direction end to the side of the Y2-direction end.

Figure 22:
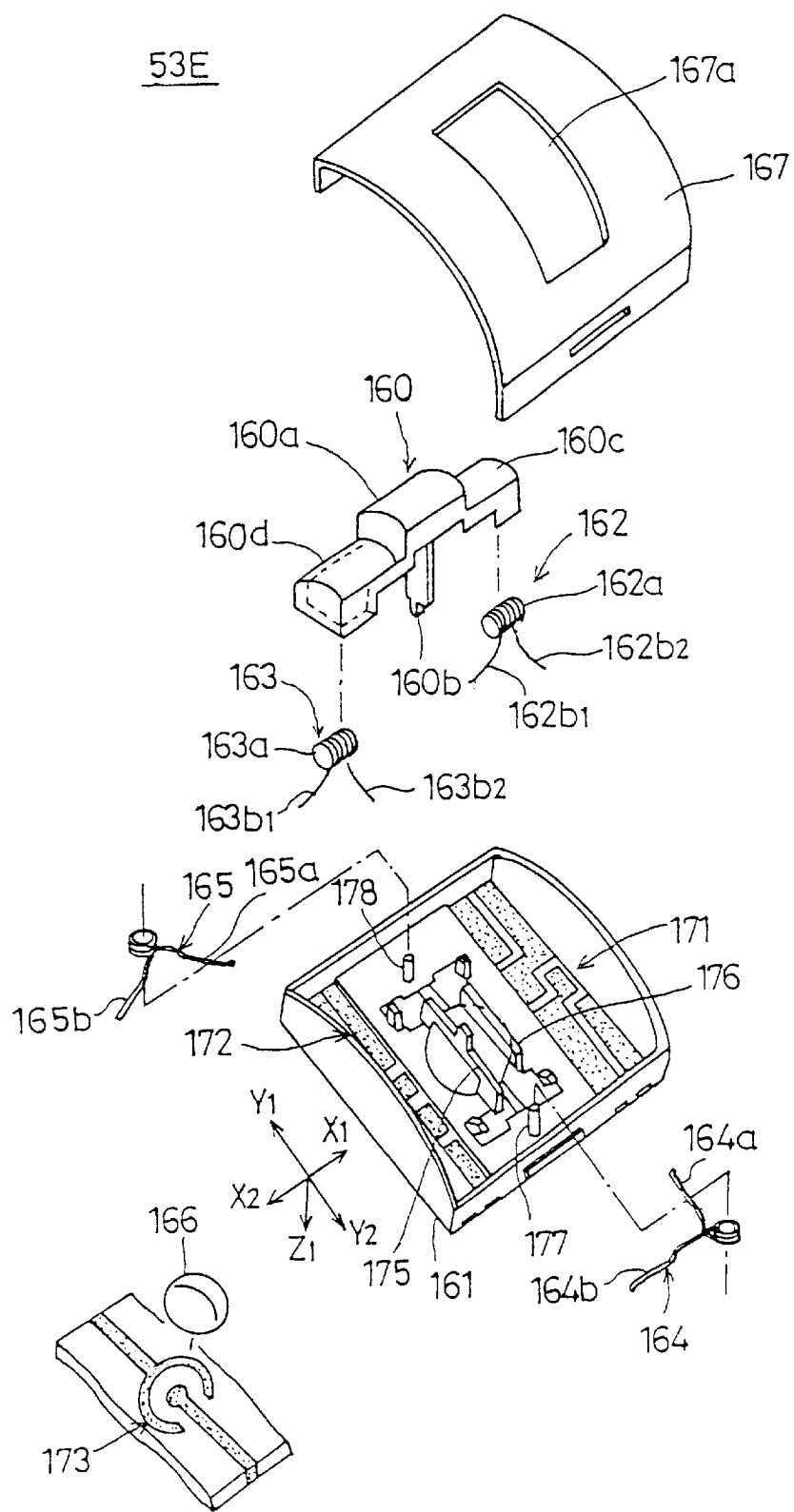
FIG. 22 shows an exploded perspective view of the multi-function key-switch unit shown in FIGS. 20A and 20B.

The multi-function key-switch unit 53E is a sliding-type switch. A stroke of a knob member 160 (see FIG. 22) is relatively long. As a result, an erroneous operation in which a switch which is not desired to be turned on is turned on is hardly performed. Thus, reliability of operation is high. The multi-function key-switch unit 53E is mounted on a printed-circuit board 46E. A knob portion 160a of the knob member 160 projects in a rectangular opening 63E of the front case 42E. The knob portion 160a is operated in any of the Y1 direction and Y2 direction for scrolling of display on the liquid crystal display unit 51E and so forth. Further, the knob member 160a is operated so as to be pushed in the Z1 direction for confirming selection.

As shown in FIGS. 21A, 21B, 21C and 22, the multi-function key-switch unit 53E has an arrangement in which, in a case 161, the knob member 160, first and second twisted-coil-spring-type contact members 162, 163, returning twisted coil springs 164, 165, and a dome-shaped movable contact member 166 are incorporated, and the case 161 is covered by an arc-surface cover 167. The first twisted-coil-spring-type contact member 162 includes a coil portion 162a, and two contact portions 162b1 and 162b2, each of which contact portions extends from the coil portion 162a. The contact portions 162b1 and 162b2 cross one another when seen in the axis direction of the coil portion 162a. The second twisted-coil-spring-type contact member 163 includes a coil portion 163a, and two contact portions 163b1 and 163b2, each of which contact portions extends from the coil portion 163a. The contact portions 163b1 and 163b2 cross one another when seen in the axis direction of the coil portion 163a.

The knob member 160 has the knob portion 160a on the top surface at the center thereof. A rod portion 160b projects downward from the center of the bottom surface of the knob member 160. The knob member 160 has an arm portion 160c extending in the X1 direction and an arm portion 160d extending in the X2 direction. The first twisted-coil-spring-type contact member 162 is attached to the arm portion 160c in a manner in which the coil portion 162a is fitted into the arm portion 160c, and the contact portions 162b1 and 162b2 project in the Z1 direction. Similarly, the second twisted-coil-spring-type contact member 163 is attached to the arm portion 160d in a manner in which the coil portion 163a is fitted into the arm portion 160c, and the contact portions 163b1 and 163b2 project in the Z1 direction.

On the top surface of the bottom plate of the case 161, a first fixed contact pattern 171 is formed on the X1-direction side, a second fixed contact pattern 172 is formed on the X2-direction side and a third fixed contact pattern 173 is formed at the center. The dome-shaped movable contact member 166 covers the third fixed contact pattern 173. Further, at the center of the top surface of the bottom plate of the case 161, guiding plates 175 and 176, each extending in the Y1–Y2 directions, are provided. Further, on the Y1-direction side and Y2-direction side of the case 161, the returning twisted coil springs 164 and 165 are attached thereto in a manner in which coil portions of the coil springs 164 and 165 are fitted to pin portions 177 and 178, respectively. The returning twisted coil spring 164 has two arm portions 164a and 164b in an open condition. The returning twisted coil spring 165 has two arm portions 165a and 165b in an open condition. The two arm portions of each of the returning twisted coil springs 164 and 165 extend over the first and second twisted-coil-spring-type contact members 162 and 163. The arm portions 164a, 164b, 165a, 165b of the returning twisted coil springs 164 and 165 elastically sandwich the first and second twisted-coil-spring-type contact members 162 and 163 from the Y1-direction side and Y2-direction side. As a result, the first and second returning twisted coil springs 164 and 165 function to return the knob member 160, which has been slid in any of the Y1 direction and Y2 direction, to a central position O. Further, the first and second twisted-coil-spring-type contact members 162 and 163 push the knob member 160 upward through the elastic restoration force thereof so that the arm portions 160c and 160d of the knob member 160 are pressed against the bottom surface of the cover 167. Further, the first and second twisted-coil-spring-type contact members 162 and 163 are electrically connected with the returning twisted coil springs 164 and 165 (see FIGS. 23A and 23B).

The arm portions 160c and 160d of the knob member 160 are held down by the bottom surface of the cover 167, and the rod 160b of the knob member 160 is fitted between the guiding plates 175 and 176. Further, the contact portions 162b1 and 162b2 of the first twisted-coil-spring type contact member 162 are in contact with the first fixed contact pattern 171. The contact portions 163b1 and 163b2 of the second twisted-coil-spring type contact member 163 are in contact with the second fixed contact pattern 172. The knob portion 160a of the knob member 160 projects through an opening window 167a of the cover 167. In the above-described condition, the knob member 160 is incorporated into the multi-function key-switch unit 53E. The knob portion 160a is located at the central position O (see FIG. 21A).

When an operator puts his or her finger tip on the knob portion 160a and operates the knob portion 160a, the knob portion 160a is moved in an arc along the curved surface of the cover 167 in the Y1–Y2 directions. At this time, as shown in FIGS. 23A and 23B, together with the knob member 160, the first and second twisted-coil-spring type contact members 162 and 163 are moved in the Y1–Y2 directions. As a result, the contact portions 162b1 and 162b2 slide on the first fixed pattern 171 and the contact portions 163b1 and 163b2 slide on the second fixed pattern 172. When the operator releases his or her finger tip from the knob portion 160a, the knob member 160 (knob portion 160a) is returned to the original central position O by the returning twisted coil springs 164 and 165. When pushing the knob portion 160a, which has been returned to the central position, in the Z1 direction, the knob member 160 is pressed down, thereby, the dome-shaped movable contact member 166 is deformed, and, as a result, the dome-shaped movable contact member 166 comes into contact with the third fixed contact pattern 173. Thus, the confirming switch is turned on.

The relationship between the operation positions of the knob portion 160a and operations of switches will now be described.

With reference to also FIG. 23C, the first fixed contact pattern 171 is long in the Y1–Y2 directions, and includes a first conducting pattern 171-1, a second conducting pattern 171-2, and ground conducting patterns 171-g1 and 171-g2. The first conducting pattern 171-1 is connected to a terminal 'a', the second conducting pattern 171-2 is connected to a terminal 'b', and the ground conducting patterns 171-g1 and 171-g2 are connected to ground terminals (G). The second fixed contact pattern 172 is long in the Y1–Y2 directions, and includes a third conducting pattern 172-3, a fourth conducting pattern 172-4, and ground conducting patterns 172-g1 and 172-g2. The third conducting pattern 172-3 is connected to a terminal 'c', the fourth conducting pattern 172-4 is connected to a terminal 'd', and the ground conducting patterns 172-g1 and 172-g2 are connected to the ground terminals (G).

The terminal 'a', the ground terminal (G) and the contact members 162 and 163 constitute a first switch 1. The terminal 'b', the ground terminal (G) and the contact members 162 and 163 constitute a second switch 2. The terminal 'c', the ground terminal (G) and the contact members 162 and 163 constitute a third switch 3. The terminal 'd', the ground terminal (G) and the contact members 162 and 163 constitute a fourth switch 4.

FIG. 23D shows turning on/off of the switches 1 through 4. The black belts in the figure indicate that the switches are turned on.

Before the knob portion 160a is operated, as shown in FIG. 23C, the contact portion 162b1 of the first twisted-coil-spring-type contact member 162 is in contact with the ground conducting pattern 171-g2 at the position 'x'. The contact portion 162b2 of the first twisted-coil-spring-type contact member 162 is in contact with the ground conducting pattern 171-g1 at the position 'x'. The contact portion 163b1 of the second twisted-coil-spring-type contact member 163 is in contact with the ground conducting pattern 172-g2 at the position 'x'. The contact portion 163b2 of the second twisted-coil-spring-type contact member 163 is in contact with the ground conducting pattern 172-g1 at the position 'x'. Each of the switches 1 through 4 is in the turned-off condition (see FIG. 23D).

When the knob portion 160a is moved in the Y2 direction, the contact portion 162b2 moves to the first conducting pattern 171-1, first, and, then, the contact portion 162b1 moves to the second conducting pattern 171-2. The contact portions 163b1 and 163b2 continue to move on the ground conducting patterns 172-g2 and 172-g1, respectively. When the knob portion 160a is moved in the Y1 direction, the contact portion 163b1 moves to the fourth conducting pattern 172-4, first, and, then, the contact portion 163b2 moves to the third conducting portion 172-3. The contact portions 162b1 and 162b2 continues to move on the ground conducting patterns 171-g2 and 171-g1, respectively.

When the knob portion 160a is moved in the Y2 direction and passes through the position P1 of the angle 7.5 degrees, the contact portion 162b2 moves to the first conducting pattern 171-1, and the first switch 1 is turned on. When the knob portion 160a is further moved and passes through the position P2 of the angle 15 degrees, the contact portion 162b2 continues to move on the first contact pattern 171-1, and the contact portion 162b1 moves to the second conducting pattern 171-2. As a result, because the contact member 162 is connected with the ground conducting patterns 172-g2 and 172-g1 of the second fixed contact pattern 172 via the returning twisted coil springs 164 and 165 and the second twisted-coil-spring-type contact member 163, the second switch 2 is turned on in addition to the first switch 1.

When the knob portion 160a is moved in the Y1 direction and passes through the position P10 of the angle 7.5 degrees, the contact portion 163b1 moves to the fourth conducting pattern 172-4, and, thereby, the fourth switch 4 is turned on. When the knob portion 160a is further moved and passes through the position P11 of the angle 15 degrees, the contact portion 163b1 continues to move on the fourth contact pattern 172-4, and the contact portion 163b2 moves to the third conducting pattern 172-3. As a result, because the contact member 163 is connected with the ground conducting patterns 171-g2 and 171-g1 of the first fixed contact pattern 171 via the returning twisted coil springs 164 and 165 and the first twisted-coil-spring-type contact member 162, the third switch 3 is turned on in addition to the fourth switch 4.

As seen from the above description, the multi-function key-switch unit 53E is a sliding-type switch, and, the stroke of the knob member 160 is relatively long. Therefore, an erroneous operation in which the switch which is not desired to be turned on is turned on is hardly performed. Thus, reliability of the operation is high.

Each of the sixth through eighth embodiments is a portable telephone which has an infrared communication function in accordance with the IrDA (Infrared Data Association). On the printed-circuit board 46, an IrMS control LSI circuit and a RISC (Reduced Instruction Set Computer) CPU are mounted. Because the portable telephone has a data communication function using infrared rays, when mobile computing is performed, it is not necessary to connect the portable telephone to a portable personal computer by using a cable, but it is sufficient to cause an infrared module of the portable telephone to face an infrared module of the portable personal computer. Thus, work of connecting the cable dose not need to be performed, and, as a result, the portable telephone can be easily used.

The sixth embodiment of the present invention will now be described.

Figure 24:
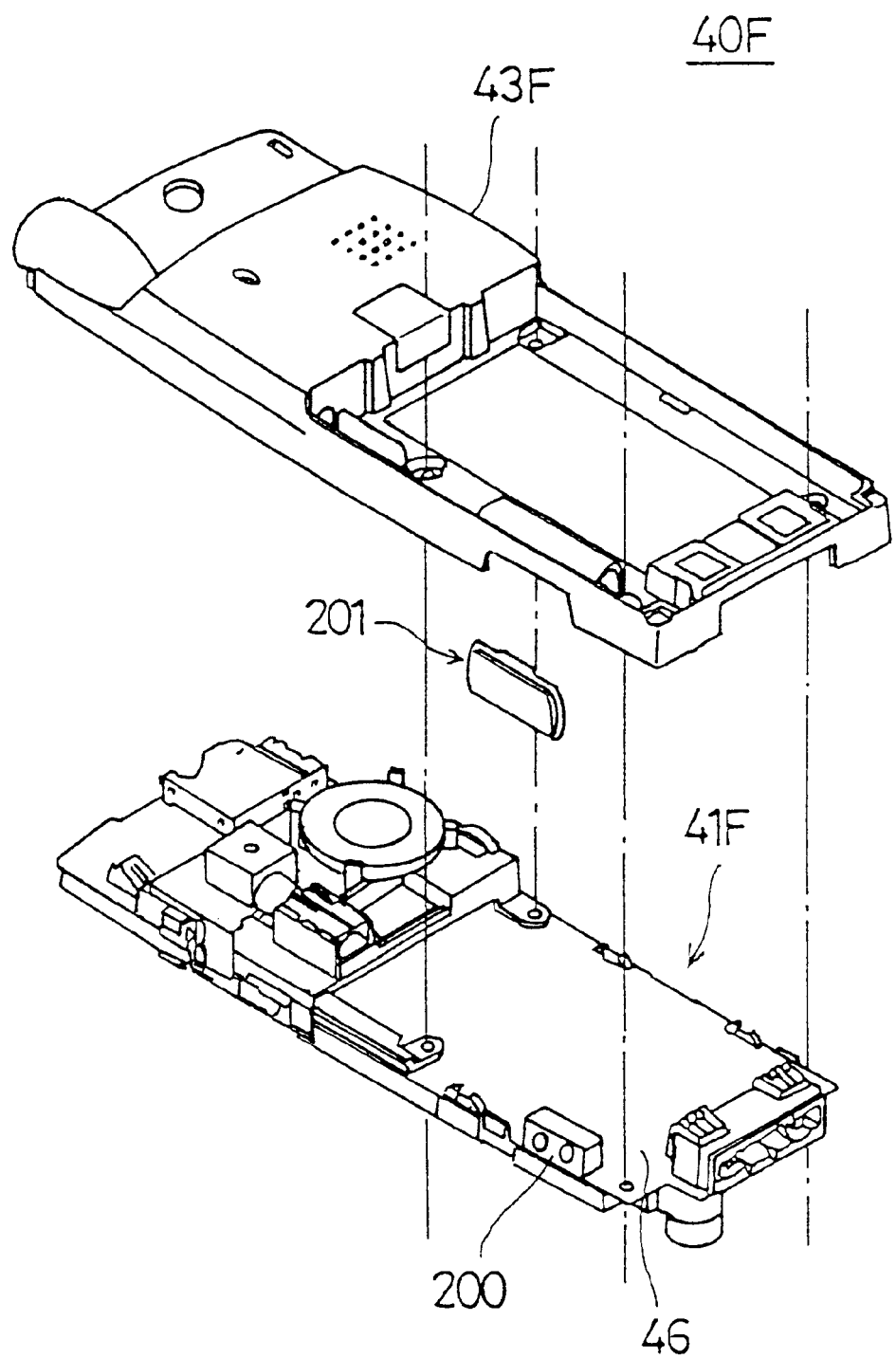
FIG. 24 shows an exploded perspective view of part of a portable telephone in a sixth embodiment of the present invention.
Figure 25:
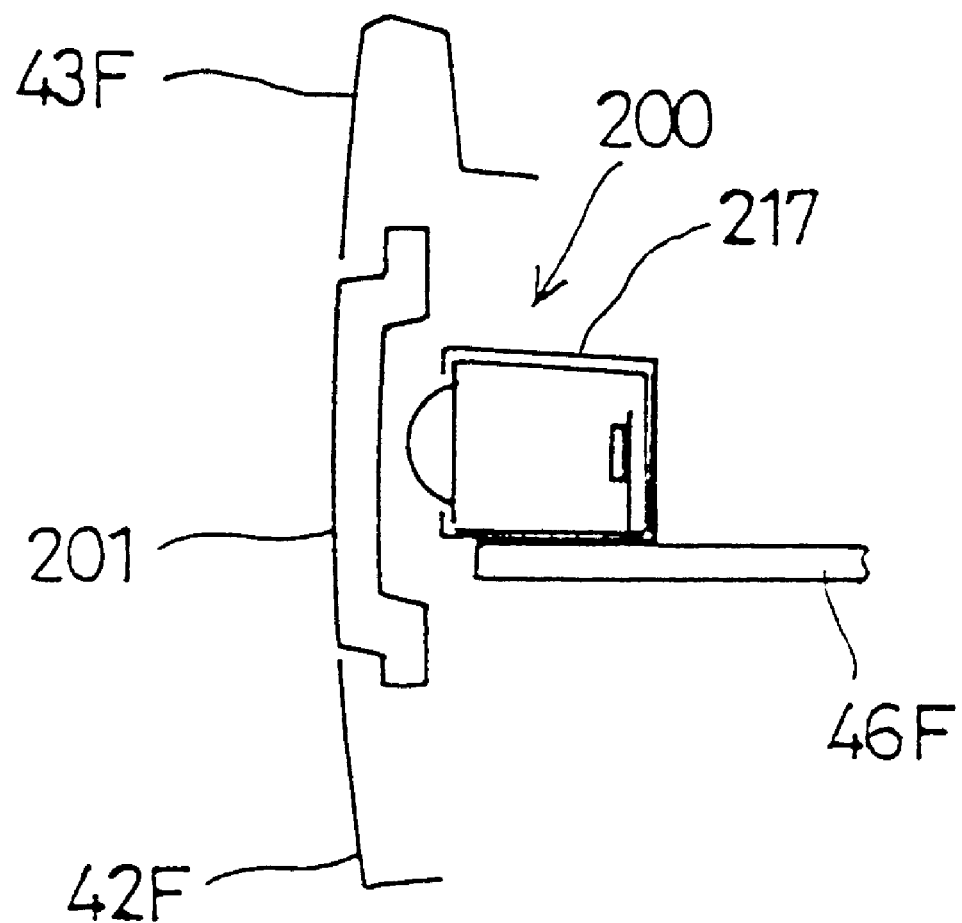
FIG. 25 shows a condition in which an infrared module has been mounted in the potable telephone shown in FIG. 24.

FIGS. 24 and 25 show a portable telephone 40F in the sixth embodiment of the present invention. An infrared module 200 is mounted on the printed-circuit board 46, at a portion adjacent to a side edge thereof, of a telephone-body assembly 41F in the portable telephone 40F. On a side surface of the portable telephone 40F, a window panel 201 is attached, and faces the front surface of the infrared module 200. The window panel 201 transmits infrared rays.

Figure 26A:
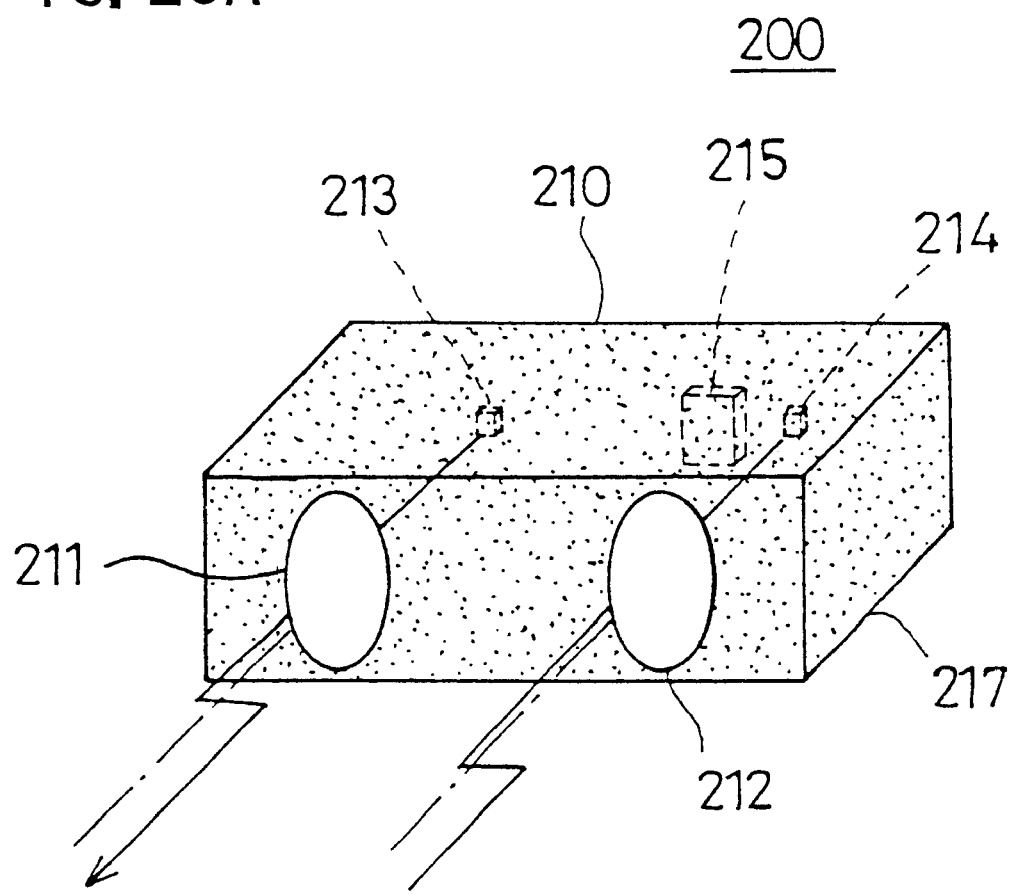
FIG. 26A shows a perspective view of the infrared module shown in FIGS. 24 and 25.
Figure 26B:
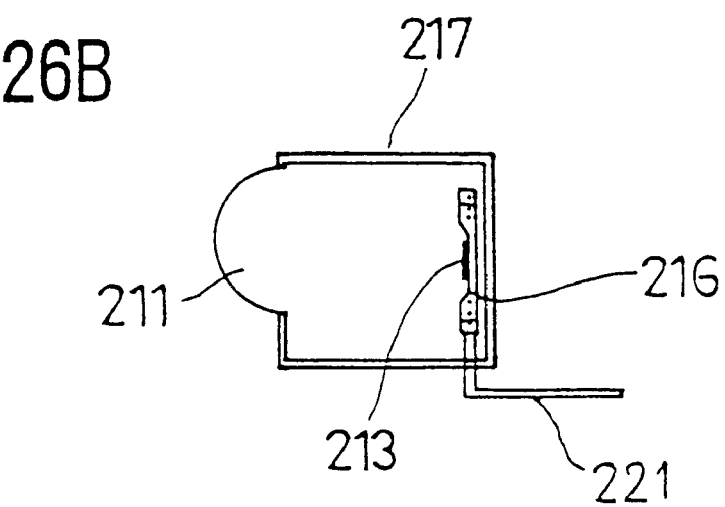
FIG. 26B shows a side-elevational sectional view of the infrared module.

As shown in FIGS. 26A and 26B, the infrared module 200 has an arrangement in which, in a box 210 which has lenses 211 and 212 provided in the front surface thereof, an infrared-emitting element 213, an infrared-receiving element 214, a signal processing IC 215 and a reflecting plate 216 are incorporated. The infrared-emitting element 213 faces the lens 211, and the infrared-receiving element 214 faces the lens 212. The reflecting plate 216 is provided on the rear side of the infrared-emitting element 213. A shielding film 217 made by plating covers all the outer surfaces of the box 210 except the portions of the lens 211 and 212. The infrared module 200 is surface-mounted on the top surface of the printed-circuit board 46 as a result of a surface-mounting terminal 221 of the infrared module (shown in FIG. 26B) being soldered to the printed-circuit board 46. Thus, the shielding film 217 of the infrared module 200 is connected to a ground pattern provided on the printed-circuit board 46.

When mobile computing is performed, an electromagnetic wave is emitted by the infrared-emitting element 213. This electromagnetic wave is shielded by the shielding film 217, and, thereby, is prevented from affecting electronic parts which are mounted on the printed-circuit board 46 around the infrared module 200. Therefore, the communication function which is the original function of the portable telephone 40F is not adversely affected.

Figure 27A:
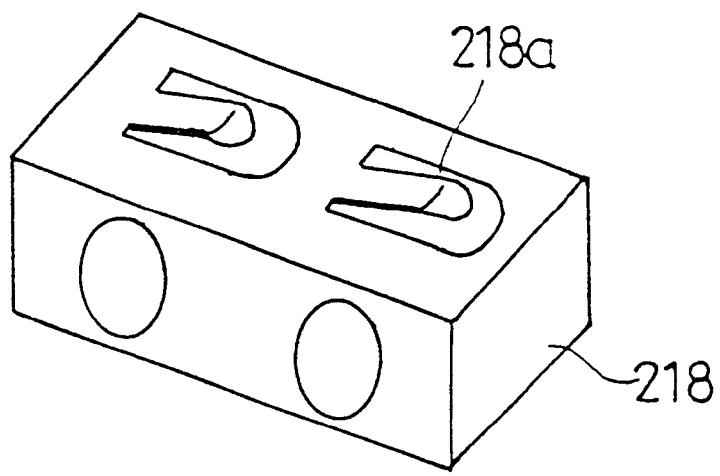
FIGS. 27A and 27B show variant embodiments of the infrared module.
Figure 27B:
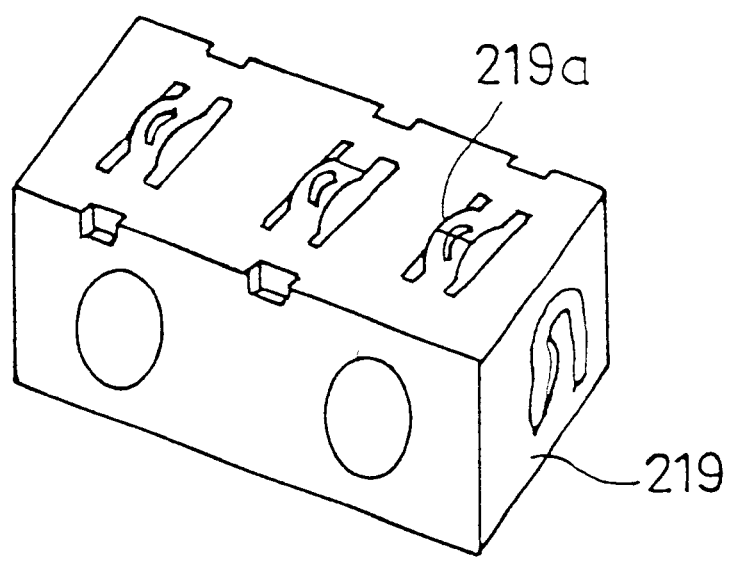

Instead of the above-described infrared module 200, any of an infrared module 200A shown in FIG. 27A and an infrared module 200B shown in FIG. 27B may be used. The infrared module 200A has an arrangement in which a sheet-metal case 218 is used for covering the internal parts. The infrared module 200B has an arrangement in which a sheet-metal case 219 is used for covering the internal parts. In the sheet metal case 218, leaf spring portions 218a are formed on the bottom surface of the infrared module 200A so that the sheet-metal case 218 is positively connected to the ground pattern provided on the printed-circuit board 46 via the leaf spring portions 218a. In the sheet metal case 219, leaf spring portions 219a are formed on the bottom surface of the infrared module 200B so that the sheet-metal case 219 is positively connected to the ground pattern provided on the printed-circuit board 46 via the leaf spring portions 219a.

The seventh embodiment of the present invention will now be described.

Figure 28A:
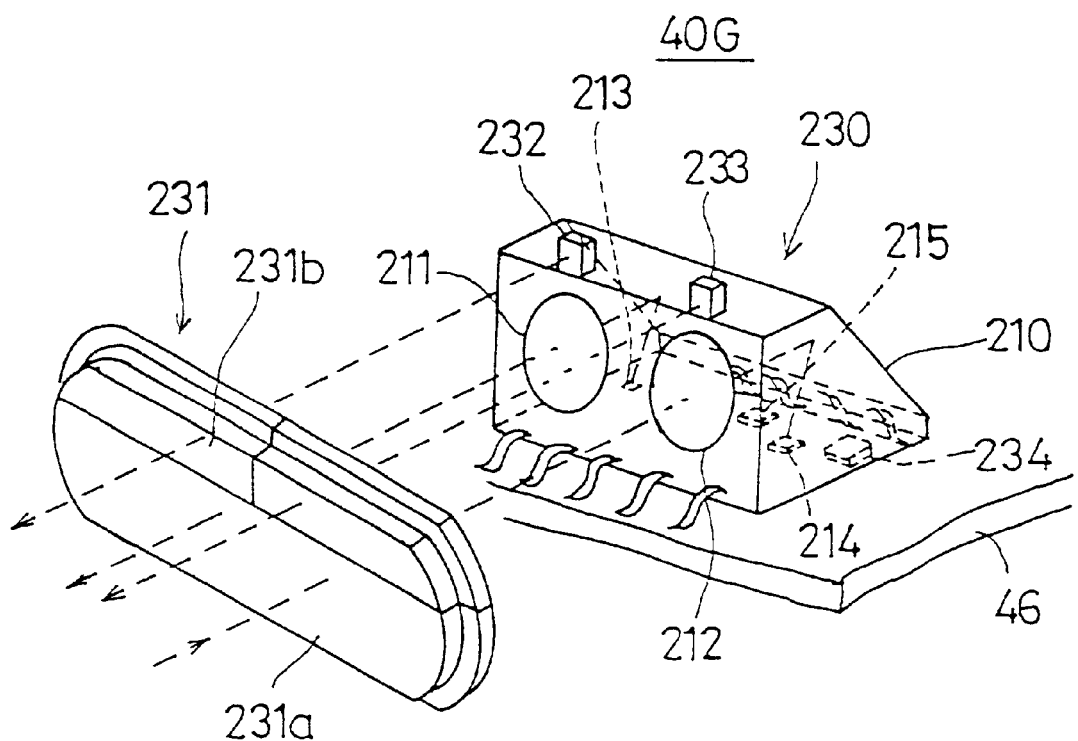
FIG. 28A shows a partially exploded perspective view of part of a portable telephone in a seventh embodiment of the present invention.
Figure 28B:
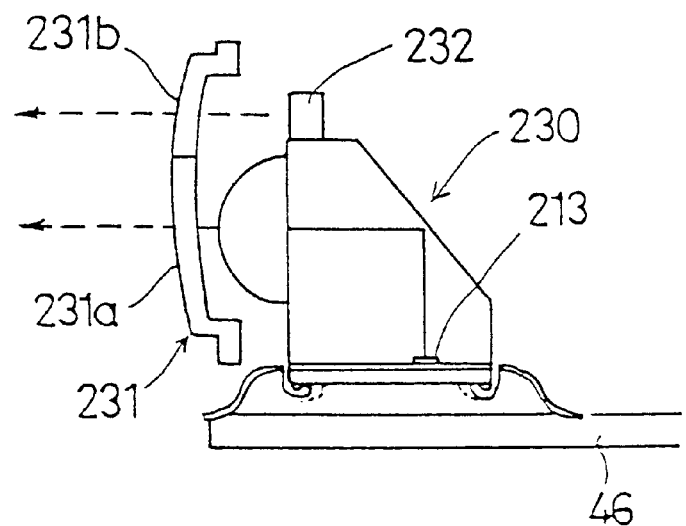
FIG. 28B shows a side-elevational sectional view of the part of the portable telephone in the seventh embodiment of the present invention.

FIGS. 28A and 28B show part of a portable telephone 40G in the seventh embodiment of the present invention. In the portable telephone 40G, an infrared module 230 is mounted on the printed-circuit board 46 at a portion adjacent to a side edge thereof. A window panel 231 is provided on the front side of the infrared module 230.

The infrared module 230 is the same as the infrared module 200 shown in FIGS. 26A and 26B except that connection-indicating LEDs 232 and 233 are provided, corresponding to the lenses 211 and 212, on the top surface of the box 210, respectively, and a connection-indicating circuit 234 is provided in the box 210. The LEDs 232 and 233 act as visible-light-emitting elements.

The window panel 231 includes a panel portion 231a which transmits infrared rays and a transparent panel portion 231b. The panel portion 231a which transmits infrared rays faces the lenses 211 and 212. The transparent panel portion 231b faces the LEDs 232 and 233. This panel 231 is manufactured through double molding or junction of the two parts.

The LEDs 232 and 233 emit light when the infrared module 230 of the portable telephone 40G is communicating with an infrared module of a portable personal computer using infrared rays.

Therefore, by visually confirming that the transparent panel portion 231b is bright, it is possible to confirm that the infrared module 230 of the portable telephone 40G is communicating with the infrared module of the portable personal computer using infrared rays. As a result, it is possible to confirm that the infrared module 230 of the portable telephone 40G is communicating with the infrared module of the portable personal computer using infrared rays while performing mobile computing. Thus, it is possible to perform mobile computing positively without anxiety.

Figure 29A:
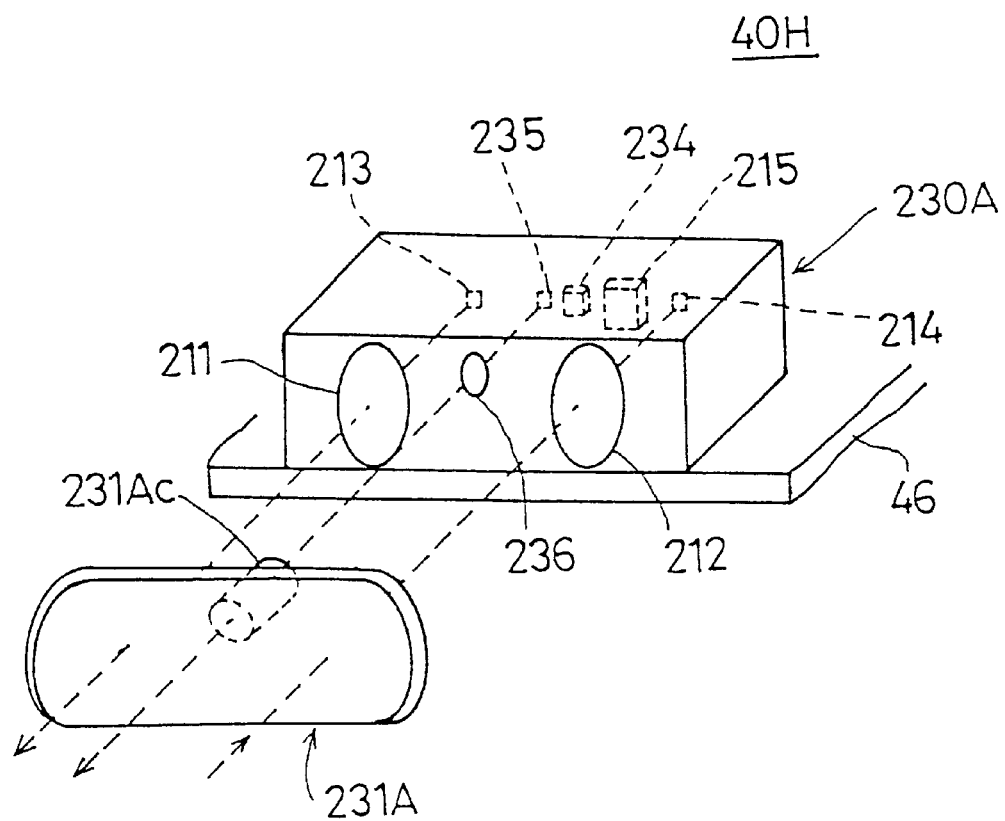
FIGS. 29A and 29B show part of a variant embodiment of the portable telephone shown in FIGS. 28A and 28B (FIG. 29A shows an exploded perspective view and FIG. 29B shows a plan view thereof)
Figure 29B:
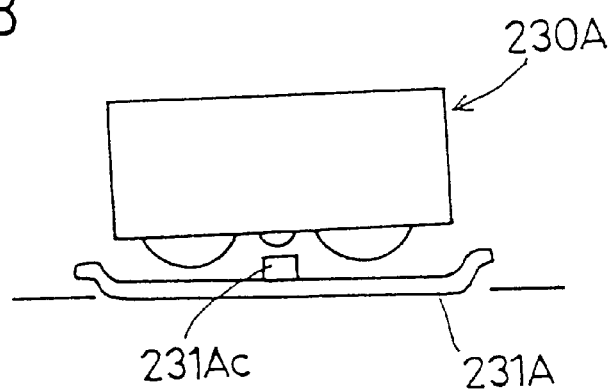

FIGS. 29A and 29B show part of a portable telephone 40H in a variant embodiment of the above-described portable telephone 40G. In the portable telephone 40H, a connection-indicating LED 235 is provided inside of the infrared module 230A. The infrared module 230A has a lens 236 corresponding to the connection-indicating LED 235. A milky-white transparent portion 231Ac is formed on the window panel 231A, which portion projects from the rear surface of the window panel 231A. This transparent portion 231Ac faces the lens 236 of the infrared module 230A.

The eighth embodiment of the present invention will now be described.

Figure 30:
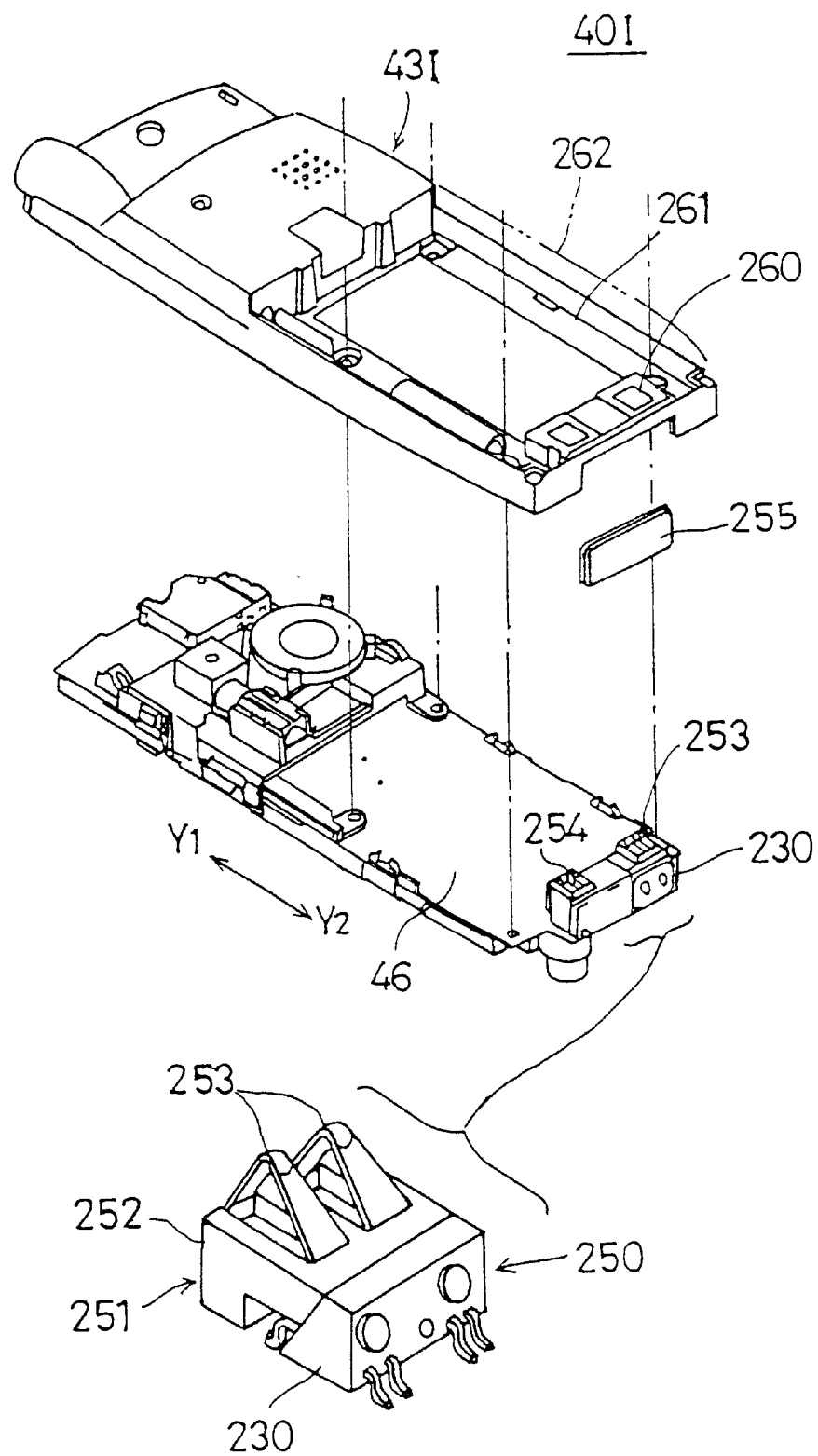
FIG. 30 shows an exploded perspective view of part of a portable telephone in an eighth embodiment of the present invention.

FIG. 30 shows part of a portable telephone 40I in the eighth embodiment of the present invention. A composite infrared module 250 is provided in the portable telephone 40I. The composite infrared module 250 has a composite arrangement in which a battery-terminal module 251 is coupled to an inclined rear surface of the infrared module 230 shown in FIGS. 28A and 28B. The battery-terminal module 251 has an arrangement in which battery (power supply) terminals 253 are incorporated in a block 252 made of synthetic resin.

The composite infrared module 250 is mounted on the printed-circuit board 46 at a position on the Y2-direction-end side. The battery terminals 253 are soldered to pads provided on the printed-circuit board 46. The composite infrared module 250 is provided in a space in the portable telephone 40I. This space corresponds to a space in a portable telephone in the related art, in which space a connector for connecting the portable telephone to a portable personal computer by a cable is provided. As a result of providing the infrared module 230, this connector is not needed in the portable telephone 40I. The position in which the composite infrared module 250 is provided in the portable telephone 40I corresponds to a position in the portable telephone in the related art, in which position battery (power supply) terminals are disposed. The front side of the infrared module 230 is covered by a window panel 255. The battery terminals 253 project to a battery loading portion 261 through an opening 260 formed in a rear case 43I. In a condition in which a battery pack 262 is loaded in the battery loading portion 261 of the portable telephone 40I, terminals of the battery pack 262 come into contact with the battery terminals 253.

Thus, the composite infrared module 250 is mounted by effectively using the space corresponding to the space in the portable telephone in the related art, in which space the connector is provided. The connector which is needed in the portable telephone in the related art is not needed in the portable telephone 40I because the infrared module 230 is provided in the portable telephone 40I. In comparison to the case where the infrared module is mounted at the position shown in FIG. 24, the area needed for mounting the parts is reduced. This point is advantageous for the portable telephone 401 for which mounting of electronic parts in high density and miniaturizing of the portable telephone are demanded. The composite infrared module 250 is incorporated into the portable telephone 401 without specially enlarging the size thereof.

It is possible that the above-mentioned battery terminals 253 are replaced with signal (battery thermistor and battery identification) terminals. In this case, the signal terminals of the composite infrared module come into contact with signal (battery thermistor and battery identification) terminals of a battery pack when the battery pack is loaded in the battery loading portion of the portable telephone. In this case, terminals 254 (shown in FIG. 30) provided in the battery loading portion are battery (power supply) terminals, and power supply terminals of the battery pack come into contact with the battery terminals of the battery loading portion when the battery pack is loaded in the battery loading portion of the portable telephone.

A portable telephone according to the present invention can be applied to a handset (child unit) of a cordless telephone which includes a telephone body (parent unit) which is connected to a public network by wire and the handset (child unit) which is connected to the telephone body (parent unit) by radio.

Further, the present invention is not limited to the above-described embodiments, and variations and modifications may be made without departing from the scope of the present invention.

The contents of the basic Japanese Patent Application No. 10-189435, filed on Jul. 3, 1998, are hereby incorporated by reference.

What is claimed is:

1. A portable device comprising a multi-function key-switch unit in which a key top is operated in a plurality of directions, wherein:

said multi-function key-switch unit comprises a stick switch which comprises a switch body and a rigid stick pivotally projecting from an opening in said switch body, and the approximately cylindrical key top which is attached to said rigid stick; and said key top has a stopper portion provided on the bottom surface thereof, said stopper portion coming into contact with an exterior surface of said switch body when said key top is operated to more than a predetermined degree so as to prevent said key top from inclining more than a predetermined angle.

2. A portable device comprising a multi-function key switch unit in which a key top is operated in a plurality of directions, wherein:

said multi-function key-switch unit comprises a stick switch which comprises a switch body and a stick projecting from said switch body, and said key top which is attached to said stick;

said key top comprises a key-top body and a shaft projecting from a center of a bottom surface of said key-top body, said shaft having a nail portion which projects from an outer circumferential surface of said shaft;

said stick has a pipe shape and an engagement opening in a circumference wall thereof, said nail portion engaging with said engagement opening, said stick further having a slit which extends from said engagement opening to a top end of said stick, said slit causing the pipe-shaped stick to be easily increased in a diameter thereof; and said shaft of said key top is fitted into said pipe-shaped stick and said nail portion engages with said engagement opening, so as to prevent rotational and linear movement of said stick relative to said key top and with reference to a common longitudinal axis of said stick and said key top.

3. A portable device comprising a multi-function key-switch unit in which a key top is operated in a plurality of directions, wherein:

said multi-function key-switch unit comprises a stick switch which comprises a switch body and a stick projecting from said switch body, and said key top which is attached to said stick;

said key top has a key-top body and a shaft projecting from a center of a bottom surface of said key-top body, said shaft having a nail portion which projects from an outer circumferential surface of said shaft and a slit on a bottom-end side thereof, said slit causing said shaft to be easily reduced in a diameter thereof;

said stick has a pipe shape and an engagement opening in a circumferential wall thereof, said nail portion engaging with said engagement opening; and said shaft of said key top is fitted into said pipe-shaped stick and said nail portion engages with said engagement opening, so as to prevent rotational and linear movement of said stick relative to said key top and with reference to a common longitudinal axis of said stick and said key top.

4. A portable telephone comprising a multi-function key-switch unit in which a key top is operated in a plurality of directions, said key top being exposed from an opening of a case of said portable telephone, wherein:

said multi-function key-switch unit comprises a stick switch which comprises a stick body and a stick projecting from said switch body, and the approximately cylindrical key top which is attached to said stick;

said key top has a plurality of recess portions at a periphery thereof;

said case has projections on an edge of said opening; and said recess portions of said key top are fitted to said projections of said case so that said key top is prevented from rotating about an axis line thereof.

5. A portable telephone comprising a multi-function key-switch unit in which a key top is operated in a plurality of directions, said key top being exposed from an opening of a case of said portable telephone, wherein:

said multi-function key switch unit comprises a stick switch which comprises a switch body and a stick projecting from said switch body, and the approximately cylindrical key top which is attached to said stick;

said key top has a plurality of projections at a periphery thereof;

said case has recess portions on an edge of said opening;

said projections of said key top are fitted to said recess portions of said case so that said key top is prevented from rotating about an axle line thereof.

6. A portable device comprising a multi-function key-switch unit in which a key top is operated in a plurality of directions, said key top being exposed from an opening of a case of said portable telephone, wherein:

said key top has a circumferential groove holding a flexible ring-shaped membrane member which extends outwardly; and said ring-shaped membrane member is in contact with an edge of said opening of said case and is configured to have a resiliency such that when the key top is inclined, a resilient restoration force of said ring-shaped membrane member causes the ring-shaped membrane member to fill a gap formed between the key top and the edge of the opening of the case in which the key top is operated.

7. A portable device comprising a multi-function key-switch unit in which a key top is operated in a plurality of directions, said key top being exposed from an opening of a case of said portable telephone, said portable telephone further comprising a keypad-collection member having the property of rubber, wherein:

said key top has an elastically compressible ring member attached to a circumferential surface thereof;

said keypad-collection member has a ring-shaped wall at a portion thereof, said ring-shaped wall surrounding said key top; and said ring member is in continuous contact with an inner circumferential surface of said ring-shaped wall;

wherein said multi-function key-switch unit comprises:

a knob which is exposed from an opening of a case of said portable telephone, said knob being movable in opposite directions about a central position, said knob being pushable at said central position;

a spring-type contact member which is attach to said knob and sliding on a contact pattern; and a dome-shaped movable contact member which is deformed by said knob which is pushed.

8. A device telephone comprising a multi-function key-switch unit in which a key top is operated in a plurality of directions, said key top being exposed from an opening of a case of said portable telephone wherein:

a packing member is provided, said packing member having a size such that said packing member can surround said multi-function key-switch unit, said packing member being mounted on a printed-circuit board on which said multi-function key-switch unit is mounted, said packing member surrounding said multi-function key-switch unit, said packing member being sandwiched between said printed-circuit board and a shielding member which covers said printed-circuit board, and said packing member comprising a water-absorbent material for inhibiting entry of moisture into a space directly above an upper surface of said printed-circuit board; and said packing member covers an opening formed between a periphery of said multi-function key-switch unit and an inner edge of an opening window which is formed in said shielding member, said opening window being larger than said multi-function key-switch unit.

9. A portable telephone unit comprising a multi-function key-switch unit, wherein said multi-function key-switch unit comprises:

a knob which is exposed from an opening of a case of said portable telephone, said knob being movable in opposite direction about a central position, said knob being pushable at said central position;

a spring-type contact member which is attached to said knob, said spring-type contact member moving integrally with said knob and sliding on a contact pattern; and a dome-shaped movable contact member which is deformed by said knob which is pushed.

10. A portable telephone comprising a multi-function key-switch unit in which a key top is operated in a plurality of directions, said key top being exposed from an opening of a case of said portable telephone, wherein:

said multi-function key-switch unit comprises a stick switch which comprises a switch body and a stick projecting from said switch body, and the approximately cylindrical key top which is attached to said stick;

said key top has a plurality of recess portions at a periphery thereof;

said case has projections on an edge of said opening; and said recess portions of said key top are fitted to said projections of said case so that said key top is prevented from rotating about an axis line thereof.

11. A portable device comprising a multi-function key-switch unit in which a key top is operated in a plurality of directions, said key top being exposed from an opening of a case of said portable telephone, wherein:

said multi-function key-switch unit comprises a stick switch which comprises a switch body and a stick projecting from said switch body, and the approximately cylindrical key top which is attached to said stick;

said key top has a plurality of projections at a periphery thereof;

said case has recess portions on an edge of said opening;

said projections of said key top are fitted to said recess portions of said case so that said key top is prevented from rotating about an axis line thereof.

12. A portable device comprising a multi-function key-switch unit, wherein said multi-function key-switch unit comprises:

a knob exposed from an opening of a case of said portable telephone, said knob being movable in opposite directions about a central position, said knob being pushable at said central position;

a spring-type contract member attached to said knob, said spring-type contract member moving integrally with said knob and sliding on a contract pattern; and a dome-shaped movable contact member which is deformed by said knob which is pushed.

* * * * *